United States Patent
Pavlu, Jr. et al.

(10) Patent No.: US 10,974,863 B2
(45) Date of Patent: *Apr. 13, 2021

(54) COLLAPSIBLE VIRTUAL REALITY VIEWER ASSEMBLY

(71) Applicant: HALLMARK CARDS INCORPORATED, Kansas City, MO (US)

(72) Inventors: Robert R. Pavlu, Jr., Overland Park, KS (US); Thomas A. Wallen, Merriam, KS (US); Scott A. Schimke, Leavenworth, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/419,440

(22) Filed: May 22, 2019

(65) Prior Publication Data

US 2019/0270540 A1    Sep. 5, 2019

Related U.S. Application Data

(63) Continuation of application No. 15/674,818, filed on Aug. 11, 2017, now Pat. No. 10,329,047, which is a
(Continued)

(51) Int. Cl.
*G02B 27/22* (2018.01)
*B65D 5/36* (2006.01)
(Continued)

(52) U.S. Cl.
CPC ......... *B65D 5/3628* (2013.01); *B65D 5/0209* (2013.01); *B65D 5/4204* (2013.01);
(Continued)

(58) Field of Classification Search
CPC ............ G02B 27/0176; G02B 27/2257; G02B 27/0179; G02B 30/37; G02B 23/20;
(Continued)

(56) References Cited

U.S. PATENT DOCUMENTS

| 189,977 A | 4/1877 | Wade |
| 2,789,460 A | 4/1957 | Kaufman |

(Continued)

FOREIGN PATENT DOCUMENTS

| EP | 1932572 A1 | 6/2008 |
| FR | 2715234 A1 | 7/1995 |

OTHER PUBLICATIONS

VRPill, Lay's Free Google Cardboard Promotion First 1000, published Sep. 1, 2015, http://www.vrpill.com/recent-news/lays-free-google-cardboard-promotion-first-1000/, 5 pages.
(Continued)

*Primary Examiner* — Audrey Y Chang
(74) *Attorney, Agent, or Firm* — Shook, Hardy & Bacon L.L.P.

(57) ABSTRACT

The present invention relates to a collapsible virtual reality viewer. Aspects of the viewer include a body portion and a viewing portion, each having a plurality of panels abutting fold lines. The viewer may be folded along the fold lines to move from an expanded configuration to a collapsed configuration when it is not being used. In one aspect, the viewer includes a detachable panel that is removeably coupled to the viewer along a plurality of perforations. Promotional material may be printed on or attached to the detachable panel. In another embodiment, the body portion and the viewing portion are each formed of a unitary construction in which the panels of each portion are die cut from a single piece of material and folded along fold lines
(Continued)

to form the body and viewing portions, which are then secured together at one or more locations.

20 Claims, 16 Drawing Sheets

Related U.S. Application Data continuation of application No. 15/196,205, filed on Jun. 29, 2016, now Pat. No. 9,864,202.

(51) Int. Cl.
  *B65D 5/02* (2006.01)
  *B65D 5/42* (2006.01)
  *G02B 23/20* (2006.01)
  *G02B 27/01* (2006.01)
  *G02B 30/37* (2020.01)

(52) U.S. Cl.
  CPC ......... *B65D 5/4229* (2013.01); *B65D 5/4233* (2013.01); *B65D 5/4266* (2013.01); *G02B 23/20* (2013.01); *G02B 27/0176* (2013.01); *G02B 27/0179* (2013.01); *G02B 30/37* (2020.01); *G02B 2027/015* (2013.01); *G02B 2027/0152* (2013.01); *G02B 2027/0169* (2013.01)

(58) Field of Classification Search
  CPC ...... G02B 2027/015; G02B 2027/0152; G02B 2027/0169; B65D 5/3628; B65D 5/0209; B65D 5/4202; B65D 5/4266; B65D 5/4229; B65D 5/4233
  USPC ............... 359/408, 466, 474, 409; 40/124.09
  See application file for complete search history.

(56) References Cited

U.S. PATENT DOCUMENTS

| | | | |
|---|---|---|---|
| 2,794,367 A * | 6/1957 | Turner | G02B 27/2257 359/474 |
| 2,933,015 A | 4/1960 | Somach | |
| 4,235,514 A | 11/1980 | Carver | |
| 4,242,818 A | 1/1981 | Carver | |
| 4,357,073 A | 11/1982 | Carver | |
| 4,478,498 A | 10/1984 | Ohno | |
| 4,846,553 A | 7/1989 | Rice | |
| 6,151,165 A | 11/2000 | Tomita | |
| 9,864,202 B1 * | 1/2018 | Wallen | G02B 27/0176 |
| 2013/0036635 A1 | 2/2013 | Mayer et al. | |
| 2016/0349836 A1 | 12/2016 | Goossens et al. | |

OTHER PUBLICATIONS

DODOcase, P2 Virtual Reality Cardboard Pop-Up Viewer, published at least as early as Jan. 11, 2016 and last retrieved Oct. 4, 2016, http://www.dodocase.com/products/p2-virtual-reality-cardboard-pop-up-viewer, 21 pages.

Printing Impressions, Market Watch, "Quad/Graphics Goes Virtual to Bring Sports Illustrated's Swimsuit Issue to Life" published Feb. 18, 2016 http://www/piworld.com/article/quad-goes-virtual-to-bring-sis-swimsuit-issue-to-life/, 5 pages.

Structural Graphics, SleekPeeks Virtual Reality Viewer, http://www.structuralgraphics.com/work/technology/virtual-reality-headsets/sleek-peeks-virtual-reality-glasses, retrieved Apr. 19, 2016, 3 pages.

Pockeyes, published as early as Jan. 1, 2016, http://pockeyes.com/en, 7 pages.

AliExpress, 2015 Google Cardboard Headmount Eva VR Viewer Reality 3D Glasses DIY for 3.5"-6" Phone, published at least as early as Jan. 11, 2016, http://www.aliexpress.com/item/2015-Google-Cardboard-HeadMount_Eva-VR-Viewer-Virtual-Reality-3D-Glasses-DIY-for-3-5-6/32446341886.html?currencyType=USD&src=google&albch=shopping&acnt=708-803-3821&isld=y&aff_short_key=UneMJZVf&albcp=206813665&albag=14156629225&slnk=&trgt=56128534817&plac=&crea=en32446341886&netw=&device=c&mtctp=&glcid.

Digital photographs of various views of a Hallmark greeting card marketed and sold in 2008, 6 pages.

* cited by examiner

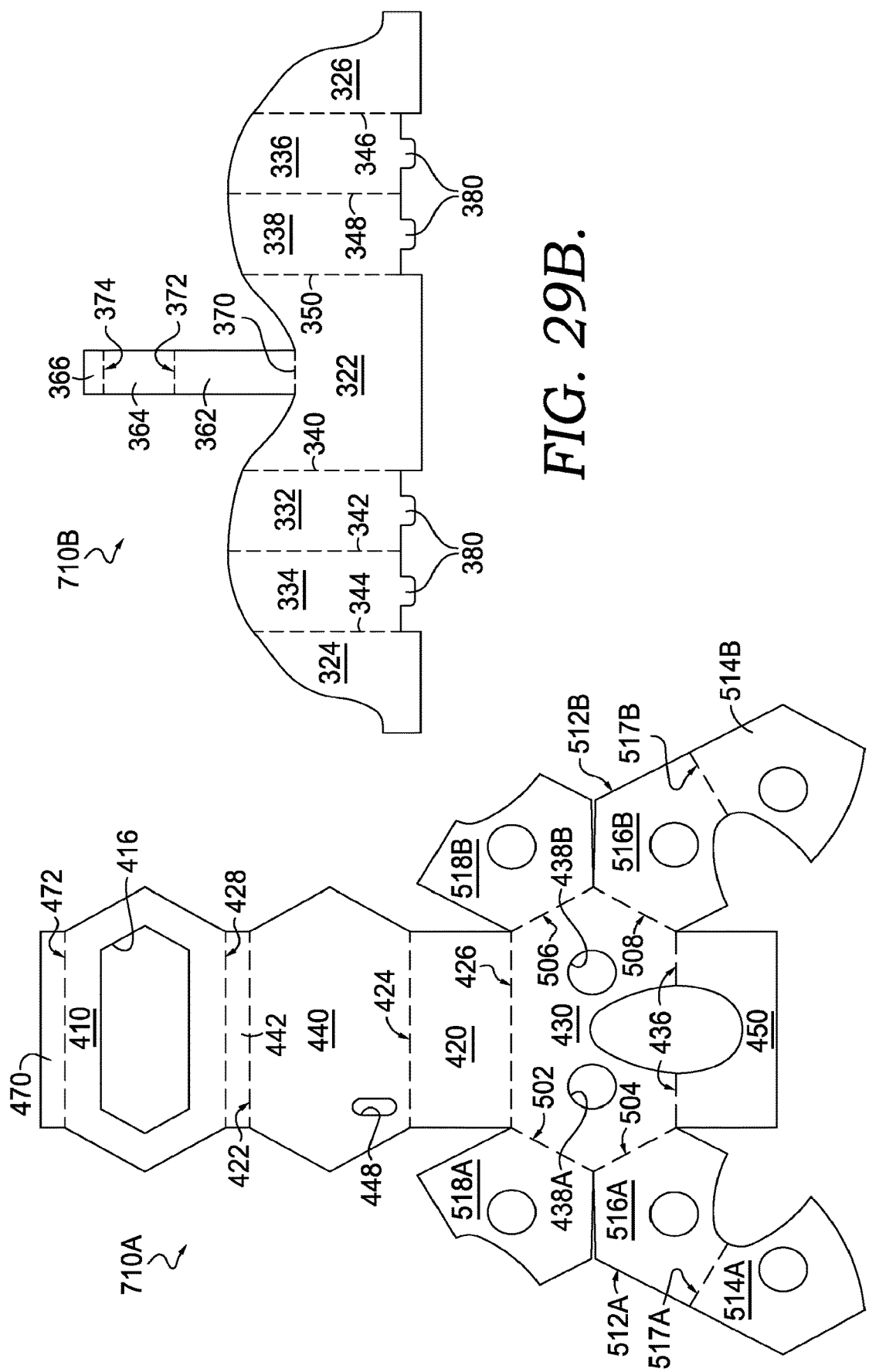

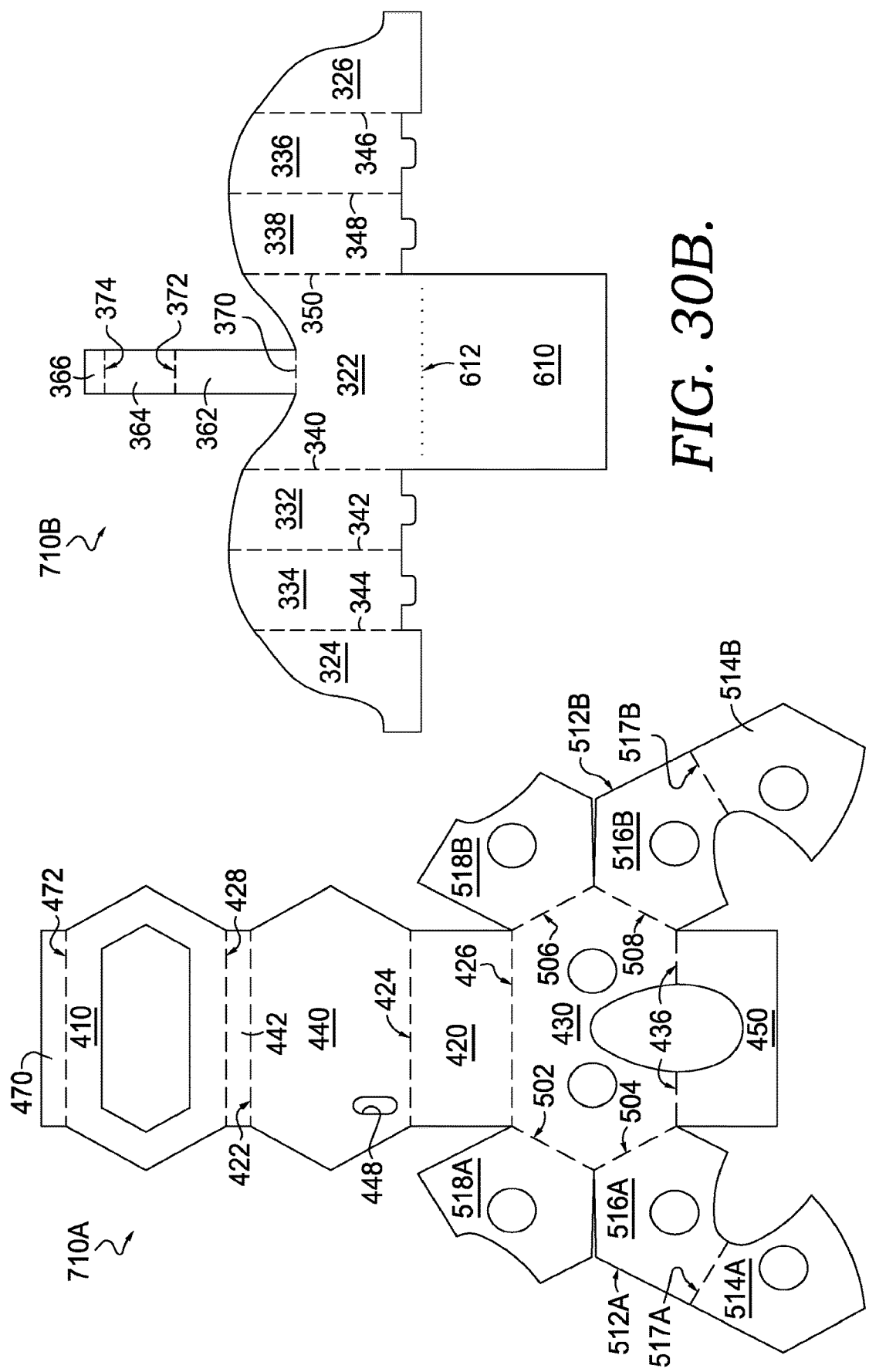

COLLAPSIBLE VIRTUAL REALITY VIEWER ASSEMBLY

CROSS-REFERENCE TO RELATED APPLICATIONS

This application is a continuation of and claims priority to U.S. Nonprovisional application Ser. No. 15/674,818, titled "Collapsible Virtual Reality Viewer Assembly, filed Aug. 11, 2017, which is a continuation-in-part of U.S. Nonprovisional application Ser. No. 15/196,205, titled "Collapsible Virtual Reality Viewer Assembly," filed Jun. 29, 2016, the entireties of these disclosures are hereby incorporated by reference.

STATEMENT REGARDING FEDERALLY SPONSORED RESEARCH OR DEVELOPMENT

Not applicable.

TECHNICAL FIELD

The present invention generally relates to assemblies for viewing virtual reality displays. More specifically, the present invention relates to various embodiments of a collapsible virtual reality viewer.

BACKGROUND

There are currently applications for computing devices, such as smartphones, that are designed to provide a user with a virtual reality experience. To achieve the virtual reality experience, a user may view a virtual reality display on the device through a viewer. The viewer may have a slot for the device, and a user can look through viewing holes to see the virtual reality display on the device. Because viewers may be used with smartphones, which are easily transportable, a user may also wish to have a viewer that is also easily transportable. Traditional viewers, however, require assembly by the user and are designed to remain in the assembled form. These traditional viewers tends to be bulky and do not easily slip into a user's pocket or purse for transporting. A fully collapsible viewer that does not require any assembly is needed to provide more a more transportable and easy-to-use viewer. Additionally, a fully collapsible viewer made from a single piece of material, such as a blank of cardstock, provides a cost-efficient option and can easily be mailed as a flat item. Further, it may be desirable to integrate promotional material into a collapsible virtual reality viewer.

SUMMARY

This summary is provided to introduce a selection of concepts in a simplified form that are further described below in the detailed description section. This summary is not intended to identify key or essential features of the claimed subject matter, nor is it intended to be used as an aid in determining the scope of the claimed subject matter. The scope of the invention is defined by the claims.

Embodiments of the present invention are directed to a collapsible virtual reality viewer for use with a device running an application that creates virtual reality displays. Aspects of the viewer comprise a body portion and a viewing portion. The body portion may include a first body wall having a first body panel and a second body wall opposite the first body wall and having a second body panel and a third body panel. The third body panel may be permanently secured to the second body panel. Additionally, the first body wall and the second body wall may be joined at one end by a first side wall having a first side panel and a second side panel and at another end by a second side wall having a third panel and a fourth panel. The body portion may also include a back wall having a back panel coupled to the first body panel and the third body panel.

The viewing portion of the collapsible viewer may include at least an inner viewing panel and an outer viewing panel. The inner viewing panel may have a display aperture for viewing a virtual reality display, and the outer viewing panel may have a first viewing aperture and a second viewing aperture for viewing the virtual reality display. The display aperture and the viewing apertures allow a user to look through the viewer to see the virtual reality display. The outer viewing panel may further include one or more viewing panel tabs configured to couple the outer viewing panel to the second body panel.

The collapsible virtual reality viewer may include a plurality of fold lines between various panels of the body portion and the viewing portion and may be configured to fold between a collapsed configuration and an expanded configuration. When in the expanded configuration, the viewing portion may be at least partially disposed within a cavity formed by the body portion, and the viewing portion and the body portion may form a slot configured to hold a virtual reality display device.

In another embodiment, the collapsible virtual reality viewer may be used with promotional material. This embodiment may comprise a body portion and a viewer portion as detailed above. The collapsible virtual reality viewer may also include a detachable portion comprising a detachable panel removeably coupled to the third body panel along a plurality of perforations. The detachable portion may include promotional material attached to or printed on the detachable panel. When in a collapsed configuration and prior to removal of the detachable panel, an interior surface of the detachable panel may contact an exterior surface of the second body panel such that the detachable panel lays underneath the second body panel.

In a further embodiment, the collapsible virtual reality viewer is a unitary piece in which the panels of the body portion and the panels of the viewing portion are all die cut from a single piece of material. Specifically, the body portion may comprise a first body panel, a first side panel adjacent the first body panel at a first fold line, a second side panel adjacent the first side panel at a second fold line, a second body panel adjacent the second side panel at a third fold line, a third side panel adjacent the second body panel at a fourth fold line, and a fourth side panel adjacent the first body panel at a fifth fold line. The body portion may further comprise a side tab configured to couple third side panel and the fourth side panel to complete an outer perimeter of the body portion. The body portion may also include a back panel adjacent the first body panel at a sixth fold line and a third body panel adjacent the back panel at a seventh fold line. The third body panel may be configured to be permanently secured to the second body panel.

Continuing to the viewing portion of the viewer, an inner viewing panel may be adjacent the second body panel at an eighth fold line. An intermediate viewing panel may be adjacent the inner viewing panel at a ninth fold line, and an outer viewing panel may be adjacent the intermediate viewing panel at a tenth fold line. The inner viewing panel may have a display aperture, and the outer viewing panel may include two viewing apertures for viewing a virtual reality display. The outer viewing panel may also include one or more viewing panel tabs configured to couple the outer viewing panel and the second body panel.

Alternative embodiments are directed to a collapsible virtual reality viewer that includes a body portion formed separately from the viewing portion and that includes one or more hinging panels to secure the body portion to the viewing portion. Like the other described embodiments, the body portion may include a first body wall having a first body panel and a second body wall opposite the first body wall and having a second body panel and a third body panel. The second body wall and the third body wall may be mirror images of one another. Additionally, the first body wall and the second body wall may be joined at one end by a first side wall having a first side panel and a second side panel and at another end by a second side wall having a third panel and a fourth panel.

The viewing portion of the collapsible viewer may include at least an outer viewing panel, an inner viewing panel and a back panel. The inner viewing panel may have a display aperture for providing a view of a virtual reality display, and the outer viewing panel may have one or more viewing apertures, such as a first viewing aperture and a second viewing aperture, for viewing the virtual reality display. The display aperture and the viewing apertures allow a user to look through the viewer to see the virtual reality display. The outer viewing panel may be adjacent a bottom panel that forms the bottom region of the viewing portion. The back panel and the inner viewing panel may form a slot configured to receive and hold a device that is configured to display the virtual reality display. The viewing portion may further comprise an intermediate viewing panel that spaces apart the outer viewing panel and the slot formed by the inner viewing panel and the back panel.

The collapsible virtual reality viewer may include a plurality of fold lines between various panels of the body portion and the viewing portion and may be configured to fold between a collapsed configuration and an expanded configuration. When in the expanded configuration, the viewing portion may be at least partially disposed within a cavity formed by the body portion.

This alternative embodiment may also be used with promotional material. Specifically, in one embodiment, the collapsible virtual reality viewer comprising a body portion and a viewer portion as detailed above may also include a detachable portion. The detachable portion may comprise a detachable panel removeably coupled to the first body panel of the body portion along a plurality of perforations. The detachable portion may include promotional material attached to or printed on the detachable panel.

In a further embodiment, a collapsible virtual reality viewer assembly comprises a viewing portion and a body portion that are each a unitary piece in which the panels of the respective portions are die cut from a single piece of material. Specifically, the body portion may be die cut from a first piece of material and may comprise a first body panel, a second body panel, a third body panel, one or more first side panels and one or more second side panels. The one or more first side panels are positioned between the first body panel and the second body panel while the one or more second side panels are positioned between the first body panel the third body panel. The one or more first side panels abut the first body panel along a first fold line and abut the second body panel along a second fold line. The one or more second side panels abut the third body panel along a third fold line and abut the first body panel along a fourth fold line.

Continuing to the viewing portion of the viewer, the viewing portion is formed from a second single piece of material. The viewing portion comprises an outer viewing panel having one or more viewing apertures for viewing a virtual reality display and an intermediate viewing panel adjacent the outer viewing panel, wherein the intermediate viewing panel and the outer viewing panel abut along a fifth fold line. The viewing portion further includes a back panel and an inner viewing panel having a display aperture for viewing the virtual reality display. The intermediate viewing panel abuts one of the inner viewing panel and the back panel along a sixth fold line. In exemplary embodiments, the intermediate viewing panel abuts the back panel along a sixth fold line, and the back panel and the inner viewing panel both abut a connecting panel such that back panel, the inner viewing panel, the connecting panel and a portion of the intermediate viewing panel are configured to form a slot for holding a virtual reality display device.

BRIEF DESCRIPTION OF THE SEVERAL VIEWS OF THE DRAWINGS

The present invention is explained in more detail with reference to the embodiments illustrated in the attached drawing figures, in which like reference numerals denote like elements, wherein:

FIGS. 29A-B depict top plan views of the viewing portion and the body portion, respectively, of the viewer depicted in FIG. 19 in an unfolded configuration, as they could be die cut from a material; and FIGS. 30A-B depict top plan views of the viewing portion and the body portion, respectively, of the viewer having a detachable portion depicted in FIG. 28 in an unfolded configuration, as they could be die cut from a material.

DETAILED DESCRIPTION

In simplest terms, the present invention may be referred to as a "collapsible virtual reality viewer." The viewer is designed to provide an easily transportable and economically manufactured headset for virtual reality viewing using a virtual reality application on a computing device, such as a smartphone. The viewer may be used when in an expanded configuration and may be collapsed to a closed configuration when not in use. In some embodiments, the viewer also includes promotional material, such as advertisements or coupons. Further, the viewer may be a unitary structure made from a single piece of material, such as cardstock. Various embodiments of the viewer are described below.

Figure 1:
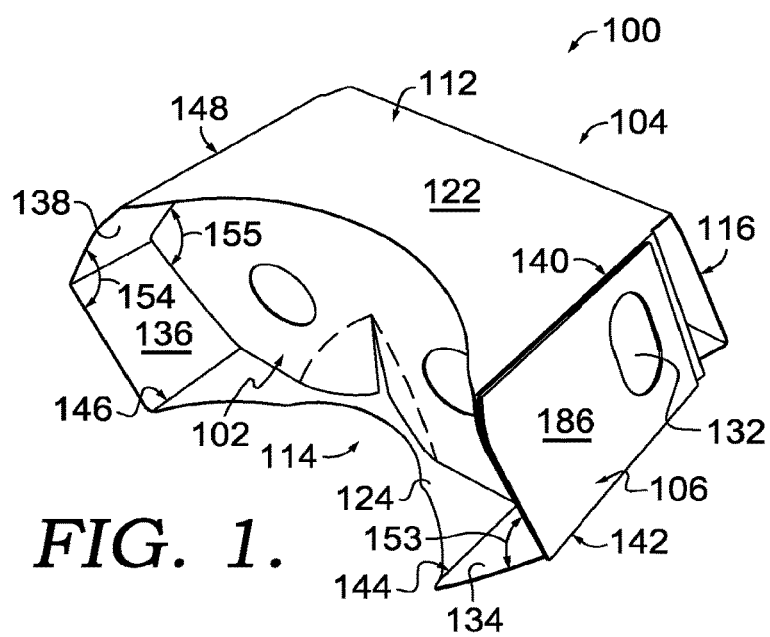
FIG. 1 depicts a front perspective view of a first embodiment of a virtual reality viewer in an expanded configuration, in accordance with an aspect of the present invention.
Figure 2:
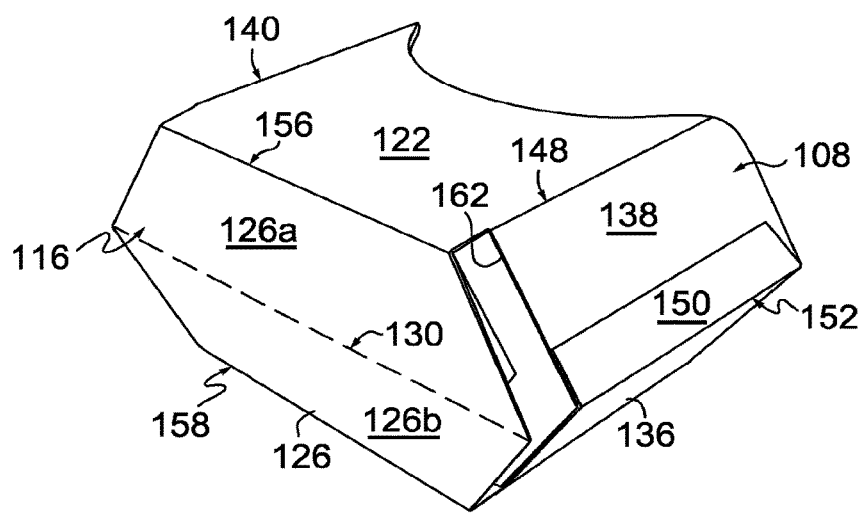
FIG. 2 depicts a rear perspective view of the viewer in an expanded configuration depicted in FIG. 1.
Figure 3:
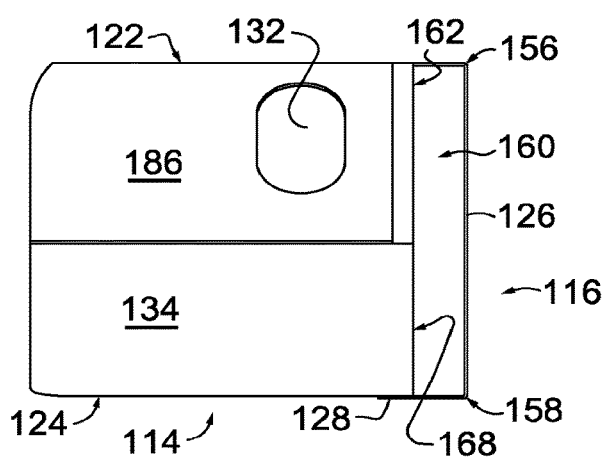
FIG. 3 depicts a side view of the viewer in an expanded configuration depicted in FIG. 1.

FIGS. 1, 2, and 3 provide a front perspective view, a rear perspective view, and a side elevation view, respectively, of a viewer 100 in an expanded configuration. In some embodiments, the viewer 100 is formed from a single piece of material that is die cut and folded to form a plurality of panels. It should be noted that the term "die cut" should be interpreted broadly to cover all types of cutting a desired shape out of a piece of material or stock (e.g. laser, scissors, pressing of dies, etc.). The material comprising the plurality of panels may be a variety of materials including plastics, natural paper, synthetic paper, and the like. In some embodiments, the panels comprise cardstock. Embodiments of the viewer 100 further comprise a plurality of fold lines between the panels that facilitate movement between the open and collapsed configurations. It should be noted that the term "fold line" as used in this disclosure should be interpreted broadly to cover all types of bends, scores, rules, creases, perforations, etc.

These panels may comprise a viewing portion 102 and a body portion 104 of the viewer 100. As illustrated in FIG. 1, the body portion 104 may at least partially enclose or surround the viewing portion 102 when the viewer 100 is in the expanded configuration. As such, the panels comprising the body portion 104 generally form the exterior of the viewer 100. Specifically, the body portion 104 may include a first body wall 112 and a second body wall 114 opposite the first body wall 112. The first body wall 112 may comprise a first body panel 122 while the second body wall 114 may comprise a second body panel 124 and a third body panel 128. The third body panel 128 may be coupled to the second body panel 124. For example, in some embodiments, at least a portion of the third body panel 128 is permanently secured to at least a portion of the second body panel 124 with a layer of adhesive. By permanently securing the third body panel 128 to the second body panel 124, the viewer 100, in a collapsed configuration, need only be expanded before it is ready for use. In this way, unnecessary assembly for the user is eliminated. It is contemplated, however, that the third body panel 128 may also be releasably coupled to the second body panel 124 with a releasable coupling mechanism such as a hook and loop fastener (e.g., Velcro®), snap-type fasteners, and the like.

The first body wall 112 and the second body wall 114 may be substantially parallel to one another. The first body wall 112 and the second body wall 114 may be joined at one end by a first side wall 106 and at an opposite end by a second side wall 108. The first side wall 106 may comprise a first side panel 132 and a second side panel 134, while the second side wall 108 may include a third side panel 136 and a fourth side panel 138. The first and second body panels 122 and 124, respectively, and the first, second, third, and fourth side panels 132, 134, 136, 138, respectively, generally form an outer perimeter of the body portion 104 of the viewer 100.

More specifically, at one end, the first side panel 132 may be adjacent the first body panel 122 at a first fold line 140 and adjacent the second side panel 134 at a second fold line 142 (sometimes described as the side panel fold line), while the second side panel 134 may be adjacent the second body panel 124 at a third fold line 144. Similarly, at the other end, the third side panel 136 may be adjacent the second body panel 124 at a fourth fold line 146 while the fourth side panel 138 may be adjacent the first body panel 122 at a fifth fold line 148. The third side panel 136 and the fourth side panel 138 may be coupled together via a side tab 150, rather than being directly coupled along a fold line. In some embodiments, the side tab 150 may abut the third side panel 136 at a side tab fold line 152 and may use a coupling mechanism to attach to the fourth side panel 138. For example, the side tab 150 may be permanently secured to the fourth side panel 138 by a layer of adhesive. In other embodiments, the side tab 150 may be adjacent the fourth side panel 138 at a fold line and attach to the third side panel 136 with a coupling mechanism. In alternative embodiments, however, the third side panel 136 and the fourth side panel 138 may directly abut a fold line while the side tab couples either the third side panel 136 to the second body panel 124 or the fourth side pane 132 to the first body panel 122.

Figure 6:
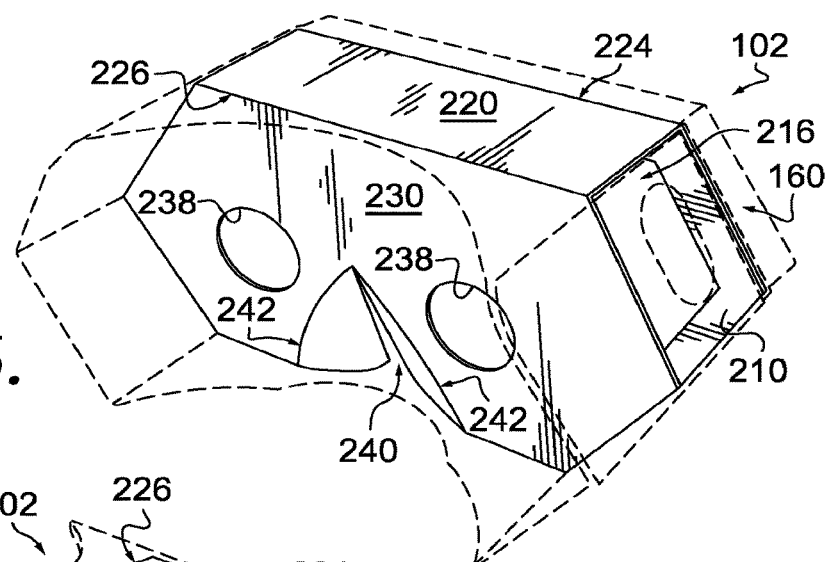
FIG. 6 depicts a front perspective view of the viewing portion of the viewer depicted in FIG. 1 with a body portion removed for clarity.
Figure 7:
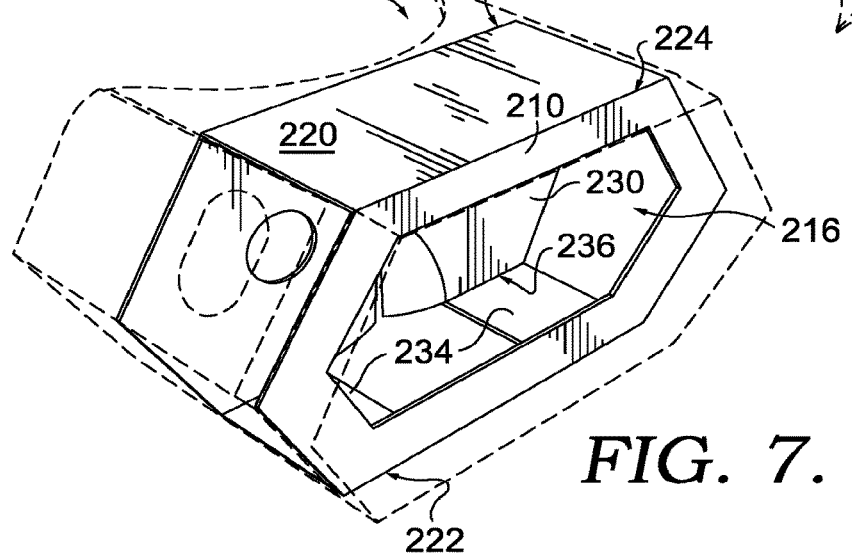
FIG. 7 depicts a rear perspective view of the viewing portion of FIG. 6.

As illustrated in FIG. 1, the first side panel 132 and the second side panel 134 may form a first angle 153 with respect to each other that is equal to a second angle 154 between the third side panel 136 and the fourth side panel 138. The first angle 153 and the second angle 154 may be determined by the shape of the panels of the viewing portion 102 that are positioned within the body portion 104. In the embodiments depicted, for instance, the panels of the viewing portion 102, which are discussed in greater detail with respect to FIGS. 6 and 7, have side walls adjacent to the first side wall 106 and the second side wall 108 of the body portion 104 that each form a viewing panel angle 155. In some embodiments, the first and second angles 153 and 154, respectively, are substantially equal to the viewing panel angle 155 when in an expanded configuration. In some embodiments, the first and second angles 153 and 154, respectively, are each less than 180 degrees. For example, the first and second angles 153 and 154, respectively, may each be approximately 115 degrees. In alternative embodiments, the first and second angles 153 and 154, respectively, may each be 180 degrees when in an expanded configuration such that the first side wall 106 is parallel to the second side wall 108. In these embodiments, the viewing panel angle 155 may also be 180 degrees.

Figure 4:
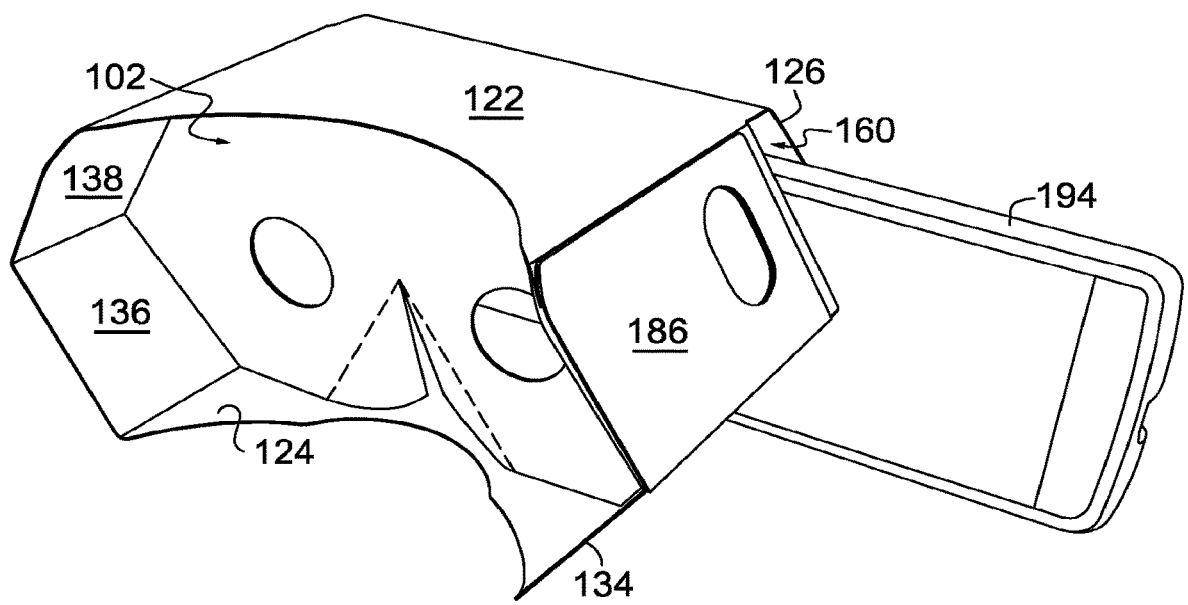
FIG. 4 depicts a front perspective view of the viewer in an expanded configuration depicted in FIG. 1 with a virtual reality display device being inserted into a slot created by the viewer.

In addition to the first and second side walls 106 and 108, respectively, the first body wall 112 and the second body wall 114 may be coupled by a back wall 116 comprising a back panel 126, as shown in FIGS. 2 and 3. The back panel 126 may be adjacent the first body panel 122 at a sixth fold line 156 and adjacent the third body panel 128 at a seventh fold line 158. The back panel 126 may include a back panel fold line 130 that divides the back panel 126 into a top portion 126a and a bottom portion 126b. When in an expanded configuration, the back panel 126 may be perpendicular to both the first body panel 122 and the third body panel 128 as well as the second body panel 124. As depicted in FIG. 3, the back panel 126 may not be directly abutting the side panels 132, 134, 136, and 138 to provide a slot 160 for receiving a virtual reality display device. As used in this disclosure, a virtual reality display device includes any device having a display screen and capable of displaying a virtual reality display. An exemplary virtual reality display device is a smartphone. To provide for a slot for the virtual reality display device, the first body panel 122 may extend beyond the back edge 162 of the first side panel 132 and the back edge 168 (shown in FIG. 2) of the fourth side panel 138. The second body panel 124, on the other hand, may not extend as far as the first body panel 122 and, therefore, may not completely extend to the back panel 126. Accordingly, the third body panel 128 may bridge the gap between the back panel 126 and the second body panel 124 to form a lower surface for a virtual reality display device received in the slot 160. FIG. 4 depicts a front perspective view of the viewer 100 with a virtual reality display device 194 being inserted into the slot 160 formed by the viewer 100.

Figure 5:
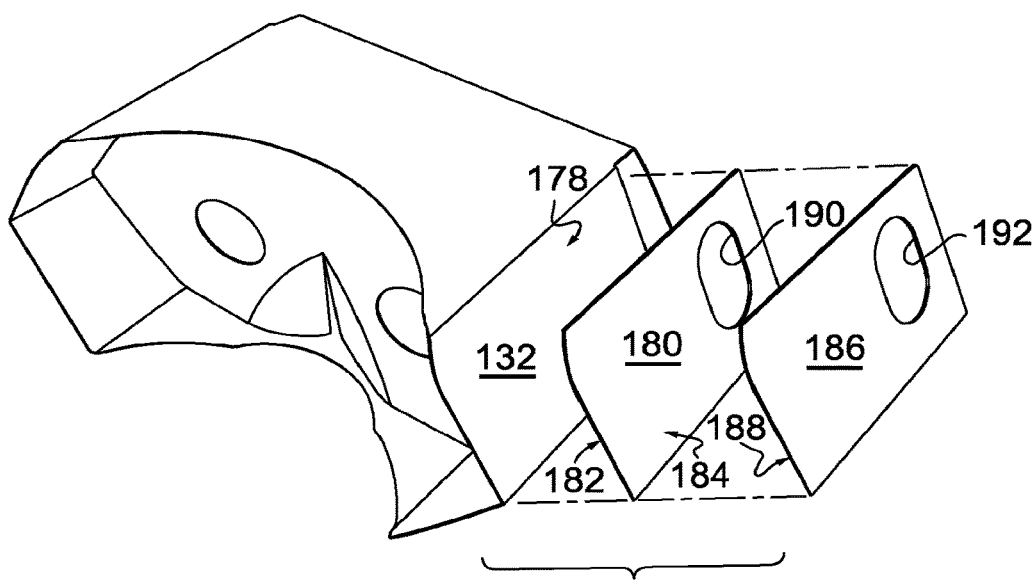
FIG. 5 depicts a front perspective view of the viewer in an expanded configuration depicted in FIG. 1 with side panels shown in an exploded view, in accordance with an aspect of the present invention.

As can be seen in FIGS. 1-4, one or more additional side panels may be positioned over and secured to the first side panel 132. FIG. 5, for example, provides a partially exploded view of the viewer 100 to show a fifth side panel 180 and a sixth side panel 186 layered on top of the first side panel 132. The fifth side panel 180 and the sixth side panel 186 may each have the same general shape as the first side panel 132. When put together, the sixth side panel 186 may overlay and be coupled to the fifth side panel 180, which may overlay and be coupled to the first side panel 132. For example, in some embodiments, an exterior surface 178 of the first side panel 132 may be permanently secured to an interior surface 182 of the fifth side panel 180 with a layer of adhesive while an exterior surface 184 of the fifth side panel 180 may be permanently secured to an interior surface 188 of the sixth side panel 186 with a layer of adhesive. The fifth side panel 180 and the sixth side panel 186 may each include an opening through which a portion of the exterior surface 178 of the first side panel 132 is visible, as shown in FIGS. 1 and 3. For example, the fifth side panel 180 has a first opening 190, and the sixth side panel 186 has a second opening 192. When the sixth side panel 186 is secured to the fifth side panel 180, the first opening 190 may be aligned with the second opening 192. In the embodiment illustrated, the first opening 190 and the second opening 192 each comprises an oval shape, but it is contemplated that the opening may include other shapes, such as a circular shape or polygon shape.

The first and second openings 190 and 192, respectively, may cooperate to form a shallow slot for holding a magnet or another object having magnetic properties, such as a coin or washer. A user may move the magnet on the exterior surface 178 of the first side panel 132 within the confines of the first and second openings 190 and 192, respectively, to interact with a virtual reality display device that is inserted into the slot 160. For example, smartphones having a magnetometer or similar technology may sense the movement of the magnet as if the user is physically touching the display screen of the smartphone. In this way, the user can control the virtual reality display on the virtual reality display device without having direct physical contact with the device. The first and second openings 190 and 192 may be positioned off center of their respective panels so that they are closer to the slot 160 than to the front of the viewer 100. In some embodiments, a magnet is integrated with the viewer 100. In other embodiments, the magnet is a separate piece.

Figure 17:
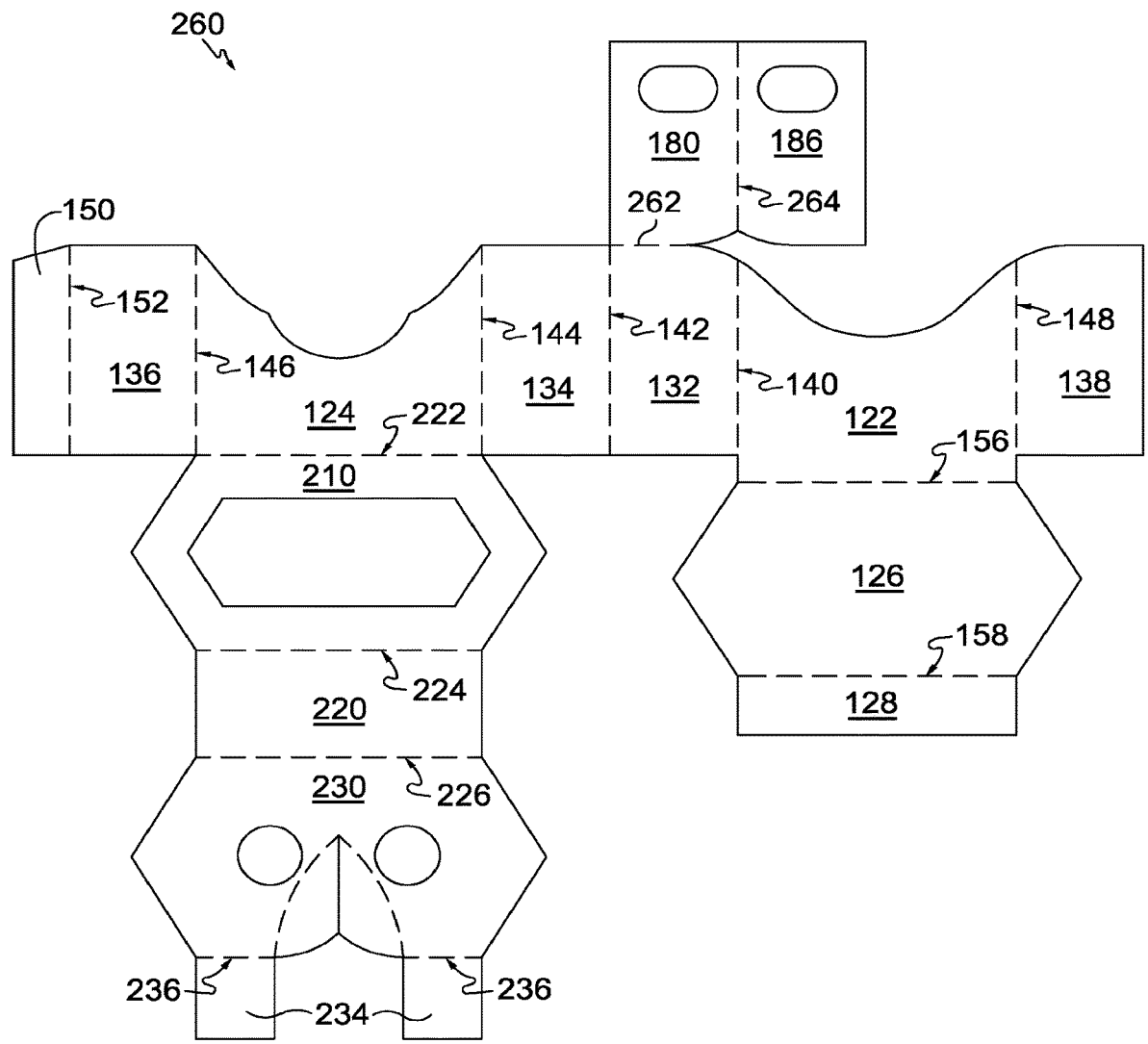
FIG. 17 depicts a top plan view of the viewer depicted in FIG. 1 in an unfolded configuration, as it could be die cut from a single sheet of cardstock.

Though the view of FIG. 5 depicts the fifth side panel 180 and the sixth side panel 186 as discrete panels separate from other panels of the body portion 104, the fifth side panel 180 and the sixth side panel 186 may be formed of the same die-cut blank as the first side panel 132, which is described further with respect to FIG. 17. Additionally, some embodiments may include only the fifth side panel 180 and not the sixth side panel 186.

All together, the walls of the body portion 104 of the viewer 100 cooperate to form and define an inner cavity within which the viewing portion 102 may be at least partially disposed. Front perspective and rear perspective views of the viewing portion 102 with the body portion 104 shown in dashed lines are provided in FIGS. 6 and 7. The viewing portion 102 may include an inner viewing panel 210, an intermediate viewing panel 220, and an outer viewing panel 230. One or more panels of the viewing portion 102 may be coupled to the body portion 104. In exemplary embodiments, for example, the inner viewing panel 210 is coupled to the second body panel 124 at an eighth fold line 222, which is further illustrated in FIGS. 17 and 18, while the outer viewing panel 230 is coupled to the second body panel 124 by one or more viewing panel tabs 234. In the embodiment illustrated, there are two viewing panel tabs 234, each adjacent a bottom edge of the outer viewing panel 230 at a viewing tab fold line 236. In an alternative embodiment, there is a single viewing panel tab 234 extending across the bottom edge of the outer viewing panel 230. The viewing panel tabs 234 may be permanently or releasably coupled to at least a portion of the second body panel 124. In some embodiments, for example, the viewing panel tabs 234 are permanently secured to the second body panel 124 via a layer of adhesive.

When the viewer 100 is in the expanded configuration, the inner viewing panel 210 and the outer viewing panel 230 are substantially parallel to each other as well as substantially parallel to the back panel 126 of the body portion 104. The inner viewing panel 210 may be positioned between the back panel 126 and the outer viewing panel 230. The inner viewing panel 210 cooperates with at least a portion of the first body panel 122, a portion of the third body panel 128 and the back panel 126 to form a slot for the virtual reality display device.

The inner viewing panel 210 and the outer viewing panel 230 may be coupled by the intermediate viewing panel 220. Specifically, the intermediate viewing panel 220 may be adjacent the inner viewing panel 210 at a ninth fold line 224 and adjacent the outer viewing panel 230 at a tenth fold line 226. When the viewer 100 is in a use position or expanded configuration, as illustrated in FIGS. 1-7, the intermediate viewing panel 220 is generally perpendicular to the inner viewing panel 210 and the outer viewing panel 230. Additionally, the intermediate viewing panel 220 is positioned underneath of and is parallel to the first body panel 122 of the body portion 104.

When in the expanded configuration, the viewer 100 is designed to allow a user to see a virtual reality display on a virtual reality display device that has been inserted into the slot 160. As such, the inner viewing panel 210 and the outer viewing panel 230 may include one or more apertures through which a user can see the virtual reality display. For example, the inner viewing panel 210 may include a display aperture 216. The display aperture 216 illustrated is the same shape of the inner viewing panel 210 and extends almost to the edges of the inner viewing panel 210. In this way, the inner viewing panel 210 provides a thin frame around the display aperture 216. The display aperture 216 may be of any desired shape. Some embodiments include a reinforcement panel identical to the inner viewing panel 210. The reinforcement panel may overlay and be secured to the inner viewing panel 210 to increase the strength of the inner viewing panel 210 around the display aperture 216.

Additionally, the outer viewing panel 230 may include one or more viewing apertures 238 that provide a user with a view of the inside of the viewer 100 to see the virtual reality display. For instance, the outer viewing panel 230 may include two circular viewing apertures 238 positioned on the outer viewing panel 230 to align with a user's eyes when the first body panel 122 is positioned against a user's forehead. Accordingly, a user may position the viewer 100 against the user's head so that each eye can see through a viewing aperture 238 in the outer viewing panel 230 and through the display aperture 216 in the inner viewing panel 210 to see a virtual realty display on a virtual reality display device inserted into the slot 160. In some embodiments, the viewer 100 includes a lens in each of the viewing apertures 238.

As the viewer 100 is designed to be used when placed up against a user's face, exemplary embodiments are adapted to fit around the user's face. For example, the front edges of the first body panel 122 and the second body panel 124 may be curved inward to accommodate the curvature of a user's face. Additionally, the outer viewing panel 230 may include a slit 240 running vertically in between the viewing apertures 238 from the bottom edge of the outer viewing panel 230 along a midline of the outer viewing panel 230. The outer viewing panel 230 may also include two curved fold lines 242 running from the top of the slit 240 to the bottom edge of the outer viewing panel 230 on each side of the slit 240. The slit 240 and the two curved fold lines 242 allow the outer viewing panel 230 to slightly open up to accommodate a user's nose when viewing a virtual reality display through the viewing apertures 238.

Figure 8:
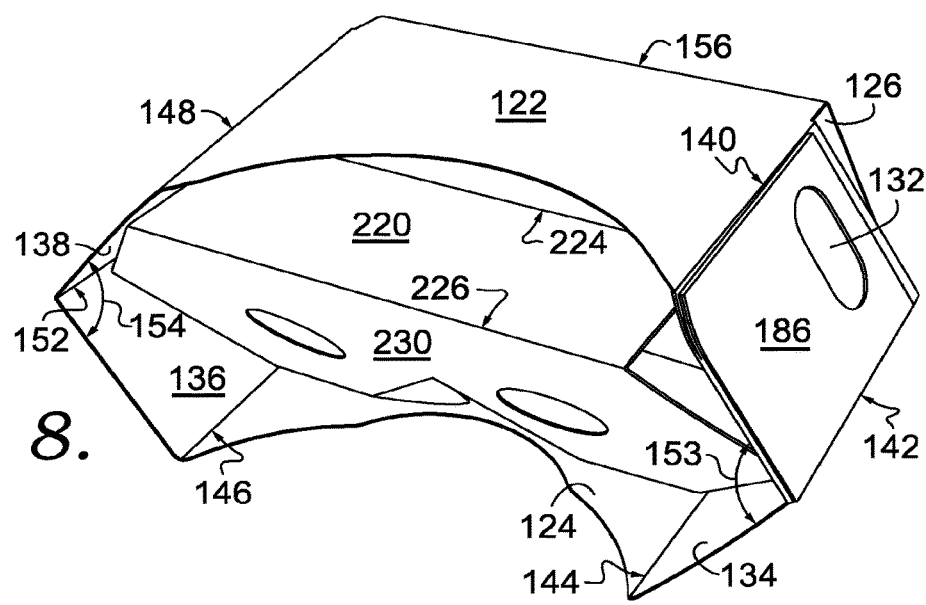
FIG. 8 depicts a front perspective view of the viewer depicted in FIG. 1 in a partially collapsed configuration.
Figure 9:
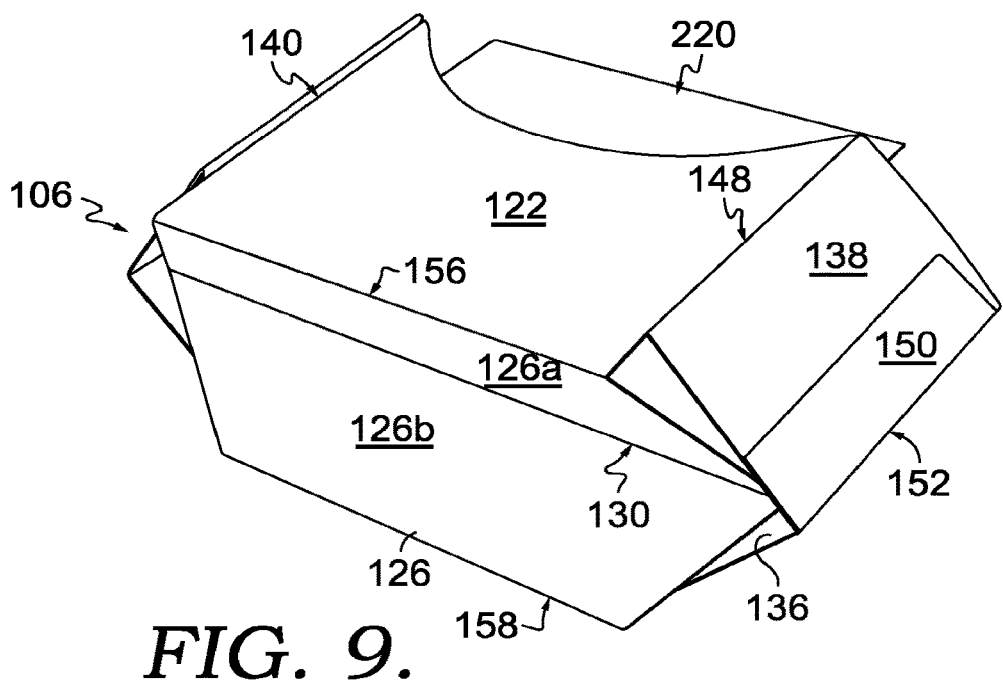
FIG. 9 depicts a rear perspective view of the viewer in the partially collapsed configuration depicted in FIG. 8.
Figure 10:
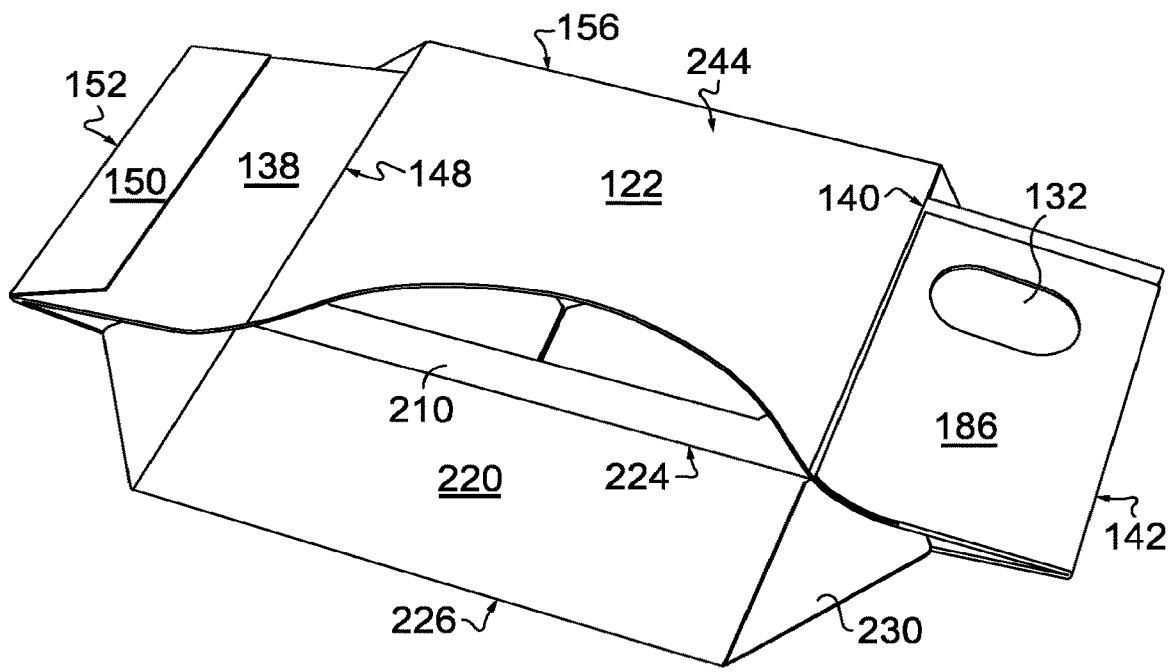
FIG. 10 depicts a top perspective view of the viewer depicted in FIG. 1 in a fully collapsed configuration.
Figure 11:
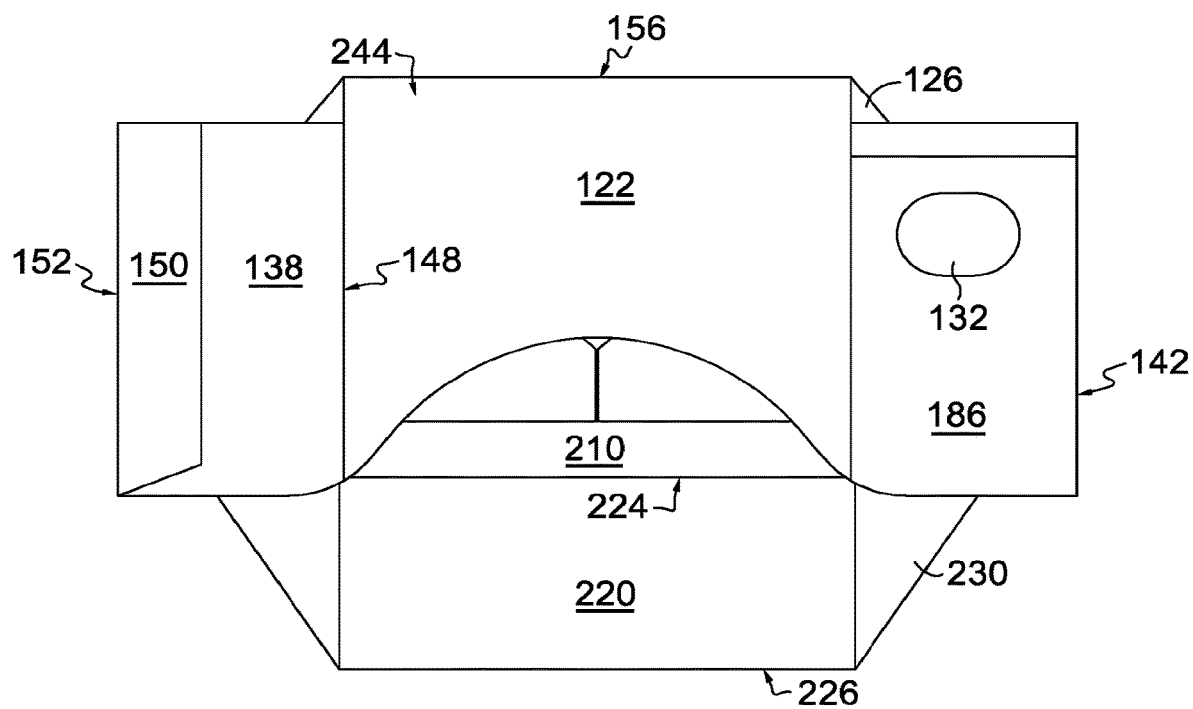
FIG. 11 depicts a top plan of the viewer in a collapsed configuration depicted in FIG. 10.
Figure 12:
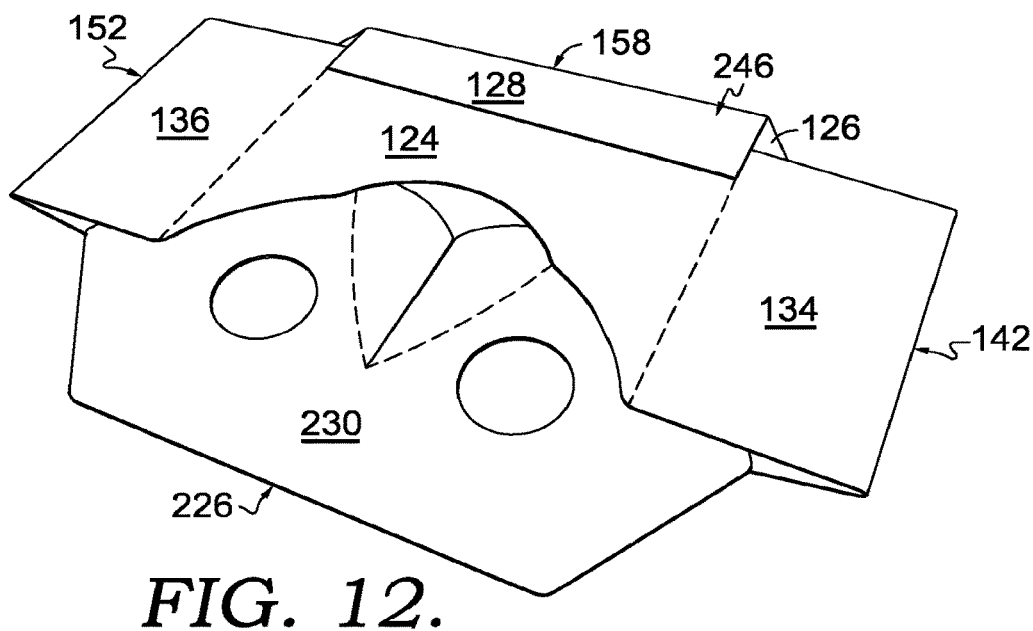
FIG. 12 depicts a bottom perspective view of the viewer in a collapsed configuration depicted in FIG. 11.
Figure 13:
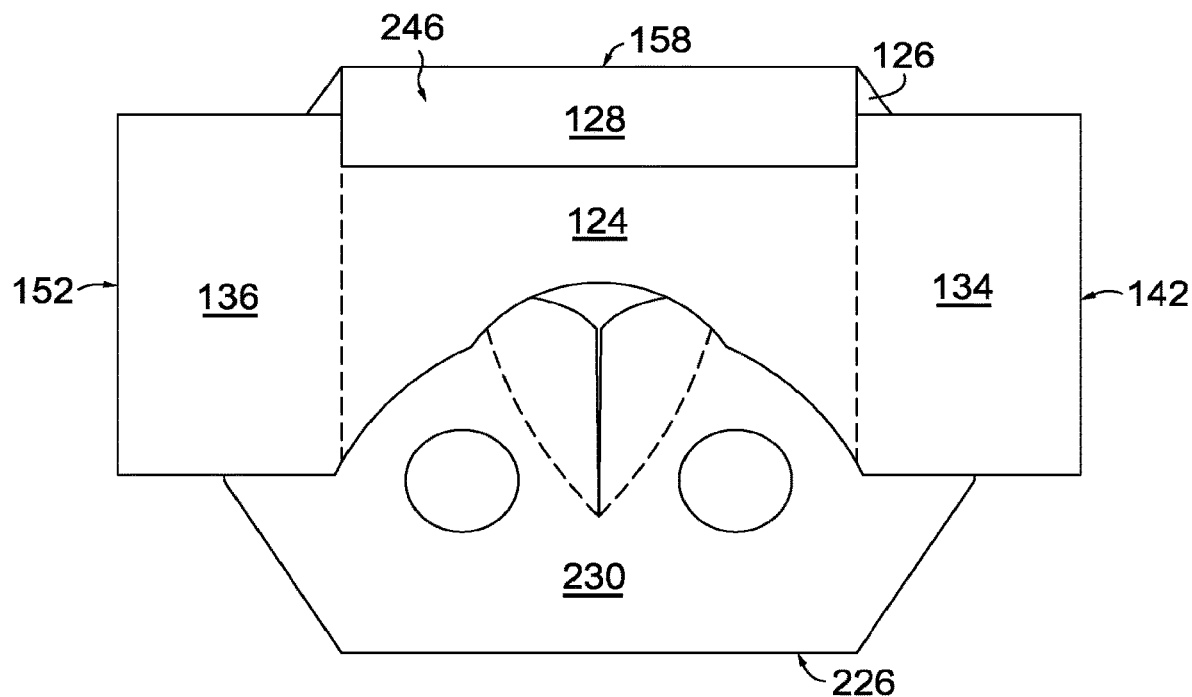
FIG. 13 depicts a bottom plan view of the viewer in a collapsed configuration depicted in FIG. 10.

When not being used in the expanded configuration to view a virtual reality display, a user may fold the viewer 100 into the collapsed configuration. FIGS. 8 and 9 provide a front perspective view and a rear perspective view, respectively, of the viewer 100 in a partially collapsed configuration. As the viewer 100 is moved into the collapsed configuration, the back panel 126 may fold at its back panel fold line 130 such that the top portion 126a of the back panel 126 moves closer to the bottom portion 126b of the back panel 126. The first side panel 132 and the second side panel 134 may fold at the second fold line 142 to move toward each other. Likewise, the third side panel 136 and the fourth side panel 138 with the attached side tab 150 fold at the side tab fold line 152 so that the first side panel 132 moves closer to the fourth side panel 138 and the side tab 150. As the side panels 132, 134, 136, and 138 are folded inwards, the first angle 153 and the second angle 154 decreases. At the same time, the first body panel 122 is moved closer to the second body panel 124 and the third body panel 128.

To allow the body portion 104 to collapse, the viewing portion 102 disposed within the cavity of the body portion 104 also collapses. Specifically, the intermediate viewing panel 220 slides forward to move out from underneath the first body panel 122, allowing the first body panel 122 to be moved closer to the second body panel 124 and the third body panel 128. The intermediate viewing panel 220 folds inward at the tenth fold line 226 towards the outer viewing panel 230 while, at the same time, folds outward at the ninth fold line 224 away from the inner viewing panel 210. Additionally, the inner viewing panel 210 and the second body panel 124 fold towards each other at the eighth fold line 222.

FIGS. 10-13 illustrate various views of the viewer 100 when in a fully collapsed configuration. In this configuration, a top surface 244 of the viewer 100, shown in FIGS. 10 and 11, comprises the sixth panel 186 that is secured to the fifth side panel (not shown) and the first side panel 132, the first body panel 122, and the fourth side panel 138 with the side tab 150 secured to a portion of the fourth side panel 138. The bottom surface 246 of the viewer 100 in a collapsed configuration, shown in FIGS. 12 and 13, comprises the second side panel 134, the second body panel 124 with the third body panel 128 secured to second body panel 124, and the third side panel 136. The back panel 126, which may be folded in half along the back panel fold line 130, and the inner viewing panel 210 may be sandwiched between the first body panel 122 and the second body panel 124. The intermediate viewing panel 220 and at least a portion of the outer viewing panel 230 may be visible and sticking out between the top surface 244 and the bottom surface 246. The viewer 100 may move from the collapsed configuration to an expanded configuration when a user pushes together the second fold line 142 and the side tab fold line 152.

When in the collapsed configuration, the viewer 100 may be relatively flat. For example, when in a fully collapsed configuration, the viewer 100 may have a thickness between the top surface 244 and the bottom surface may be less than one-fourth of an inch in some embodiments. The ability of the viewer 100 to be placed in a collapsed position to have a thin profile may be desirable when using the viewer 100 for promotional purposes. For example, the viewer 100 with promotional material, such as advertisements, may be handed out by businesses or mailed to potential customers.

Figure 14:
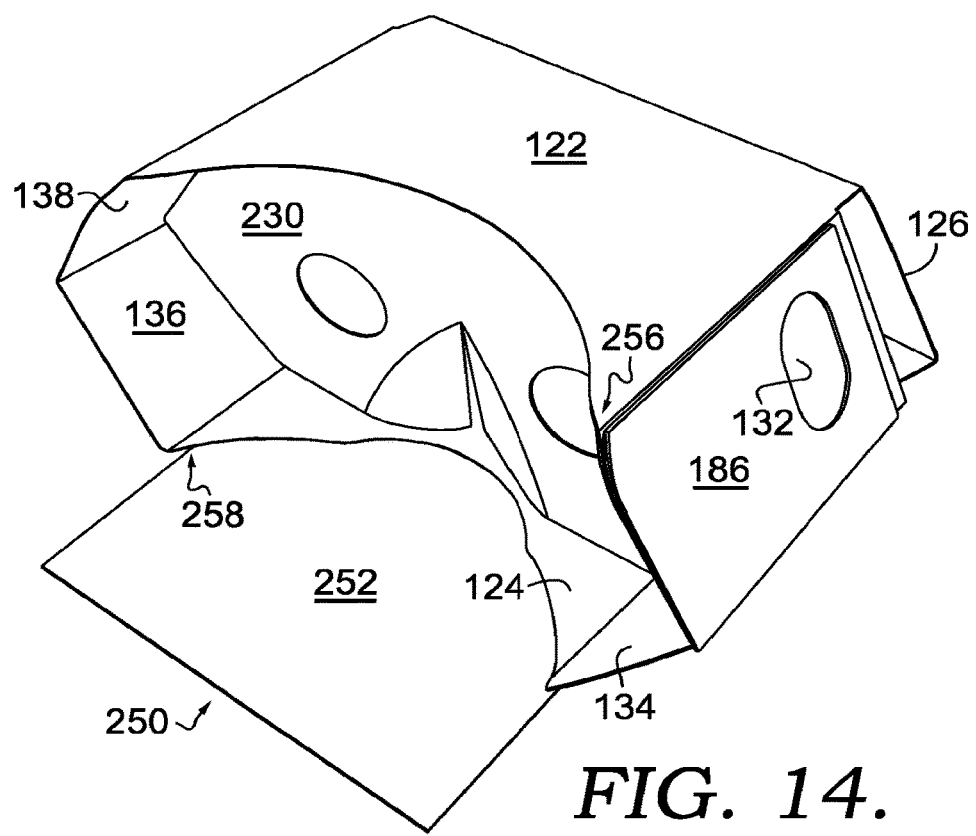
FIG. 14 depicts a front perspective view of a viewer having a detachable portion and in an expanded configuration, in accordance with an alternate embodiment of the present invention.
Figure 15:
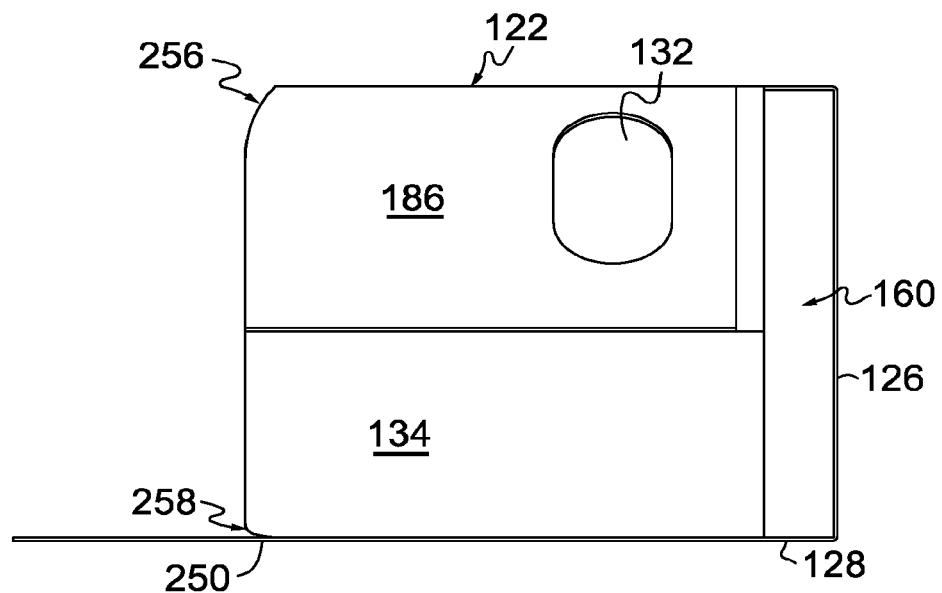
FIG. 15 depicts a side elevation view of the viewer having a detachable portion and in an expanded configuration depicted in FIG. 14.
Figure 16:
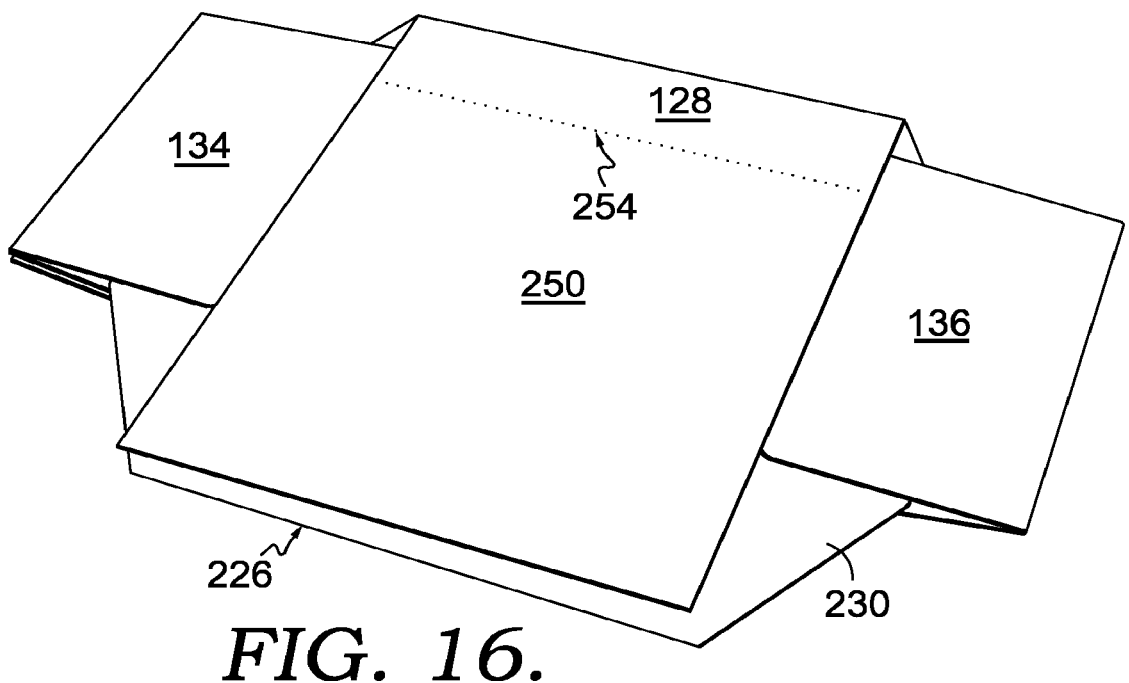
FIG. 16 depicts a bottom perspective view of the viewer having a detachable portion depicted in FIG. 14 in a collapsed configuration.

Embodiments of the viewer 100 with promotional materials are depicted in FIGS. 14-16. In these embodiments, the viewer 100 may include a detachable portion 250. The detachable portion 250 may include a detachable panel 252 coupled to the third body panel 128 at a fold line. In some embodiments, such as the one illustrated in FIG. 16, this fold line is a plurality of perforations 254. The plurality of perforations 254 may be the only mechanism attaching the detachable panel 252 to the rest of the viewer. Accordingly, the detachable panel 252 may be completely detachable from the rest of the viewer 100 along the plurality of perforations 254. The detachable panel 252 may include printed promotional material, such as an advertisement, a coupon, or business information, printed on the detachable panel 252. The detachable panel 252 may also include a mailing address such that the viewer 100 can be used as a mailer. The printed promotional material may be printed directly on the detachable panel 252 or secured to the detachable panel 252, for example, by an adhesive. In some instances, the promotional material is removeably coupled to the detachable panel 252. The detachable panel 252 may also take the appearance of and function as a greeting card. Printed material (e.g., designs, sentiment, etc.) may be printed directly on interior and exterior surfaces (i.e., top and bottom sides) of the detachable panel 252.

Prior to removal, the detachable panel 252 may be positioned underneath the second body panel 124 such that an interior surface of the detachable panel 252 contacts an exterior surface of the second body panel 124. In the embodiment shown, the detachable panel 252 extends past the front edge 256 of the first body panel 122 and the front edge 258 of the second body panel 124. When in the collapsed configuration (FIG. 16), the detachable panel 252 may extend to the tenth fold line 226 between the intermediate viewing panel 220 and the outer viewing panel 230. It is contemplated, however, that the detachable panel 252 may be other sizes and shapes while still achieving the object of the present disclosure. For example, the detachable panel 252, in the illustrated embodiment, has a width dimension approximately equal to width dimensions of the first and second body panels 122, 124. In an alternate embodiment, the detachable panel 252 may have a width dimension approximately equal to a width dimension of the viewer 100 in the collapsed position. In this embodiment the detachable panel 252 would cover most of the second and third side panels 136, 136 in FIG. 16. It should be noted that the detachable panel 252 has the added benefit of covering and protecting any lenses in the viewing apertures 238 during both storage and the mailing process.

Figure 18:
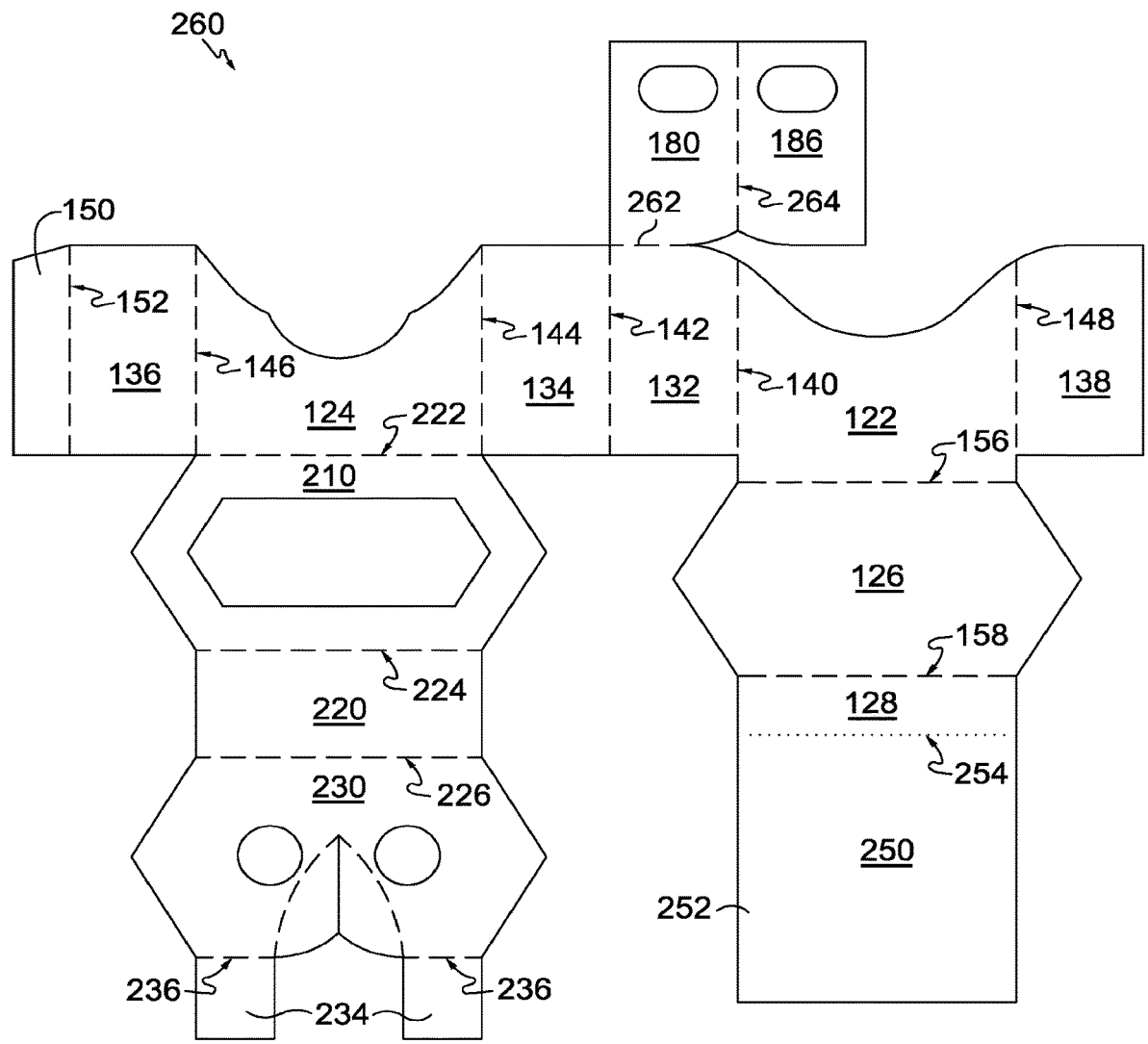
FIG. 18 depicts a top plan view of the viewer having a detachable portion depicted in FIG. 14 in an unfolded configuration, as it could be die cut from a single sheet of cardstock.

As previously mentioned, the viewer 100 may comprise a unitary construction. In other words, the various panels comprising the viewer 100 may be manufactured from a single piece of paper or cardstock. In that regard, FIGS. 17 and 18 illustrate die-cut blanks 260 of cardstock or paperboard material that can be folded along the illustrated fold lines to make the viewer 100. By forming the viewer 100 from a single unitary piece of cardstock, the cardstock may be run through a printer prior to being cut out to print a design, coloring, a pattern, advertisement, or other indicia on one or both sides of the viewer 100.

With reference to FIG. 17, the portions of the blank 260 are identified by the reference characters discussed above with respect to the assembled viewer 100. Starting with the viewing portion 102, the outer viewing panel 230 is folded inward at the tenth fold line 226 towards the interior surface of the intermediate viewing panel 220 while the intermediate viewing panel 220 is folded inward at the ninth fold line 224 towards the interior surface of the inner viewing panel 210. The inner viewing panel 210 is folded inward at the eighth fold line 222 towards the interior surface of the second body panel 124, and the viewing panel tabs 234 on the outer viewing panel 230 are folded inward at their respective viewing tab fold lines 236 to be secured to the interior surface of the second body panel 124.

The panels of the body portion 104 may also be folded inward to enclose the viewing portion 102. The first body panel 122 may fold inward at the first fold line 140 towards the interior surface of the first side panel 132, which may fold inward at the second fold line 142 towards the interior surface of the second side panel 134. The second side panel 134 may fold inward at the third fold line 144 towards the interior surface of the second body panel 124, and the third side panel 136 may fold inward at the fourth fold line 146 towards the interior surface of the second body panel 124. The fourth side panel 138 may fold inwards at the fifth fold line 148 towards the interior surface of the first body panel 122 while the side tab 150 may fold inwards at the side tab fold line 152 towards the interior surface of the third side panel 136. As such, the fourth side panel 138 may be adjacent to the side tab 150 so that the side tab 150 may be secured to the fourth side panel 138. The back panel 126 may be folded inward towards the interior surface of the first body panel 122 at the sixth fold line 156. The third body panel 128 may fold inward at the seventh fold line 158 towards the interior surface of back panel 126. A portion of the third body panel 128 may be secured to the exterior surface of the second body panel 124.

As previously discussed, the viewer may also comprise a fifth side panel 180 and a sixth side panel 186, which may be part of the blank 260 illustrated in FIG. 17. The fifth side panel 180 may be adjacent the first side panel 132 at a fifth side panel fold line 262, and the sixth side panel 186 may be adjacent the fifth side panel 180 at a sixth side panel fold line 264. The fifth side panel 180 may fold at the fifth side panel fold line 262 toward an exterior surface of the first side panel 132. An interior surface of the fifth side panel 180 may be releasably or permanently secured to the exterior surface of the first side panel 132. The sixth side panel 186 may fold at the sixth side panel fold line 264 towards the exterior surface 184 of the fifth side panel 180 and be releasably or permanently secured to the exterior surface 184 of the fifth side panel 180.

FIG. 18 depicts the blank 260 of FIG. 17 with the addition of the detachable portion 250. As such, the various panels discussed with respect to the blank in FIG. 17 apply to FIG. 18, and FIG. 18 further shows the blank 260 having a detachable panel 252 that is removeably coupled to the third body panel 128 along a plurality of perforations 254. When the third body panel 128 is folded at the seventh fold line 158 towards the interior surface of the back panel 126, the detachable panel 252 is also moved with the third body panel 128. Because the detachable panel 252 is part of a single die-cut blank with the other panels, promotional material may be printed one or both sides of the detachable panel 252 at the same time a background, pattern, or other indicia is printed on the other panels of the viewer. Additionally, eliminating the need to assemble promotional material with a separate viewer may decrease the cost of manufacturing the viewer for promotional purposes.

Turning to FIGS. 19-22, various views of an alternative embodiment of a collapsible virtual reality viewer 300 in an expanded configuration are provided. Similar to viewer 100, the viewer 300 is formed from a plurality of panels that comprise a viewing portion 302 and a body portion 304 of the viewer 300. Unlike with viewer 100, the body portion 304 and viewing portion 302 may be constructed from separate sheets of material; however, the body portion and the viewing portion may be permanently secured together such that they are configured to collapse and expand together without additional assembly or disassembly by the user. Further, the viewer 300 may be configured to receive a virtual reality display device without requiring the user to couple or uncouple any of the panels.

Figure 19:
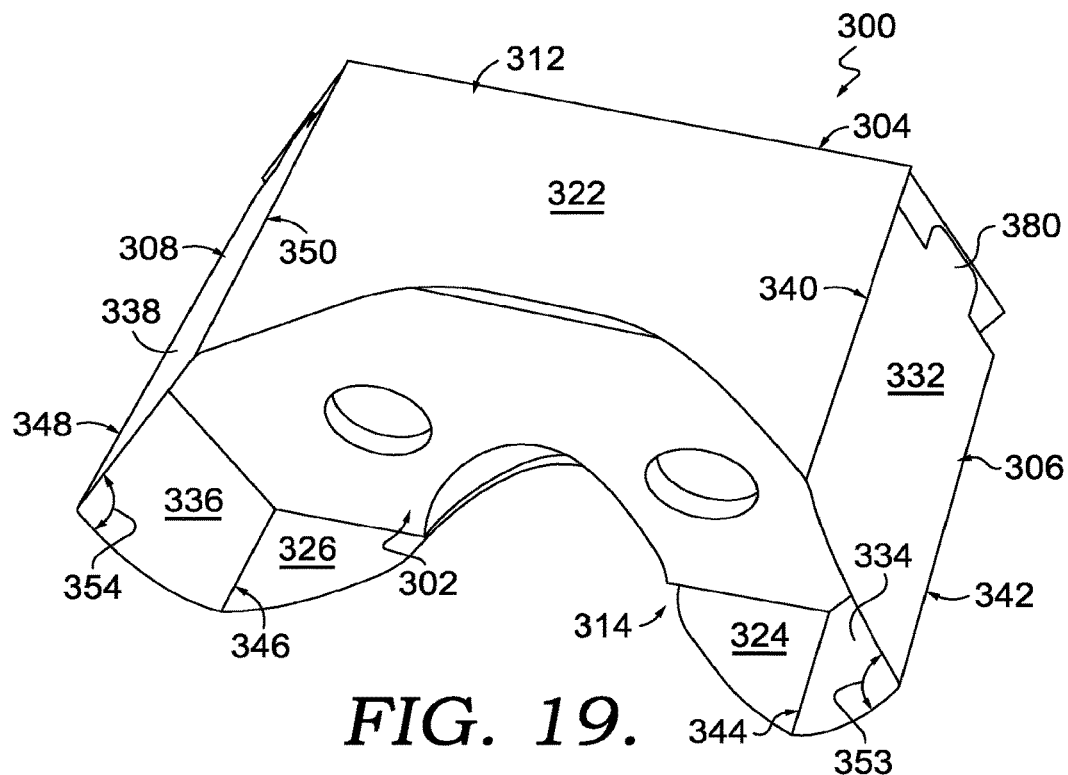
FIG. 19 depicts a front perspective view of a second embodiment of a virtual reality viewer in an expanded configuration, in accordance with an aspect of the present invention.

As illustrated in FIG. 19, the body portion 304 may at least partially enclose or surround the viewing portion 302 when the viewer 300 is in the expanded configuration. The body portion 304 may include a first body wall 312 and a second body wall 314 opposite the first body wall 312. The first body wall 312 may comprise a first body panel 322 while the second body wall 314 may comprise a second body panel 324 and a third body panel 326 that are both substantially parallel to the first body panel 322. The third body panel 326 of viewer 300 is different than the third body panel 128 of viewer 100 in that the third body panel 326 may have an identical size and shape of the second body panel 324 such that each of the third body panel 326 and the second body panel 324 form half of the second body wall 314.

The first body wall 312 and the second body wall 314 may be joined at one end by a first side wall 306 and at an opposite end by a second side wall 308. The first side wall 306 may comprise a first side panel 332 and a second side panel 334, while the second side wall 308 may include a third side panel 336 and a fourth side panel 338. More specifically, at one end, the first side panel 332 may be adjacent the first body panel 322 at a first fold line 340 and may be adjacent the second side panel 334 at a second fold line 342, while the second side panel 334 may be adjacent the second body panel 324 at a third fold line 344. Similarly, one the other side, the third side panel 336 may be adjacent the third body panel 326 at a fourth fold line 346 and adjacent the fourth side panel 338 at a fifth fold line 348. Unlike viewer 100, the third side panel 336 and the fourth side panel 338 may be coupled together directly via the fifth fold line 348. The other end of the fourth side panel 338 may be adjacent the first body panel 322 along a sixth fold line 350.

As illustrated in FIG. 19, the first side panel 332 and the second side panel 334 may form a first angle 353 with respect to each other that is equal to a second angle 354 between the third side panel 336 and the fourth side panel 338. The first angle 353 and the second angle 354 may be determined by the shape of the panels of the viewing portion 302 that are positioned within the body portion 304. In some embodiments, the first and second angles 353 and 354, respectively, are each less than 180 degrees. For example, the first and second angles 353 and 354, respectively, may each be approximately 115 degrees. In alternative embodiments, the first and second angles 353 and 354, respectively, may each be 180 degrees when in an expanded configuration such that the first side wall 306 is parallel to the second side wall 308.

Although not illustrated in FIG. 19, some embodiments of viewer 300 include additional side panels layered on one or more of the side panels 332 334, 336, and 338 in a similar manner described with respect to viewer 100. Additionally, the additional side panels may comprise openings, similar to openings 190 and 192 in FIG. 1, to form a shallow slot for holding a magnet or another object having magnetic properties, such as a coin or washer. A user may move the magnet or other object within the confines of the openings to interact with a virtual reality display device positioned in the viewer 300.

Figure 23:
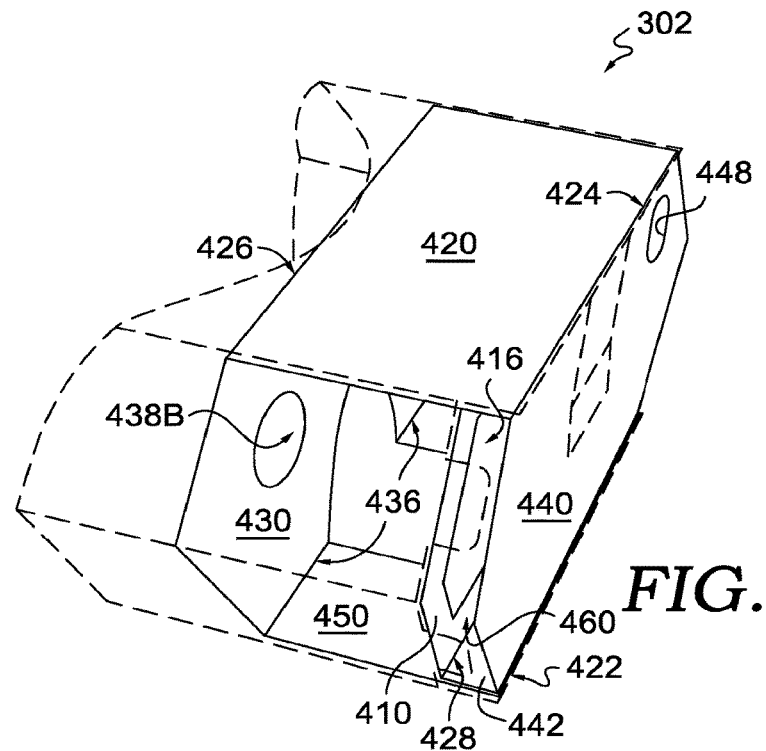
FIG. 23 depicts a rear perspective view of the viewing portion of the viewer depicted in FIG. 19 with the body portion removed for clarity.

All together, the walls of the body portion 304 of the viewer 300 cooperate to form and define an inner cavity within which the viewing portion 302 may be at least partially disposed. Turning to FIG. 23, a rear perspective view of the viewing portion 302 is provided with the body portion 304 shown in dashed lines for clarity. The viewing portion 302 may comprise an inner viewing panel 410, an outer viewing panel 430, a back panel 440, an intermediate viewing panel 420, and a bottom panel 450.

When the viewer 300 is in the expanded configuration, as shown in FIG. 23, the back panel 440, the inner viewing panel 410, and the outer viewing panel 430 are substantially parallel to one other. The inner viewing panel 410 may be positioned between the back panel 440 and the outer viewing panel 430 and may be coupled to the back panel 440 via a connecting panel 442. When in the expanded configuration, the intermediate viewing panel 420 may be substantially perpendicular to the back panel 440, the inner viewing panel 410, and the outer viewing panel 430. At the same time, the intermediate panel 420 may be substantially parallel to the bottom panel 450 and the connecting panel 442 coupling the back panel 440 and the inner viewing panel 410. As such, the intermediate viewing panel 420 may be positioned underneath of and parallel to the first body panel 322 of the body portion 304, and the bottom panel 450 may be positioned above and parallel to the second and third body panels 324 and 326, respectively, of the body portion 304.

Being parallel to one another, the inner viewing panel 410 and the back panel 440 may form a slot 460 between each other. The slot 460 may be used to hold a virtual reality display device, such as the virtual reality display device 194 shown in FIG. 4. The slot 460 formed between the inner viewing panel 410 and the back panel 440 may be spaced apart from the outer viewing panel 430 by the intermediate viewing panel 420. Specifically, the intermediate viewing panel 420 may be adjacent the outer viewing panel 430 at a seventh fold line 426 and may be adjacent either the inner viewing panel 410 or the back panel 440 at another fold line. In the embodiment illustrated in FIG. 23, the intermediate viewing panel 420 is adjacent the back panel 440 along an eighth fold line 424. The opposite end of the back panel 440 may be adjacent the connecting panel 442 that spaces apart the back panel 440 and the inner viewing panel 410. The connecting panel 442 may be adjacent the back panel 440 along a ninth fold line 422 and adjacent the inner viewing panel 410 at a tenth fold line 428. Accordingly, the connecting panel 442 may form a bottom portion of the slot 460, and the portion of the intermediate viewing panel 420 between the back panel 440 and the inner viewing panel 410 may form a top portion of the slot 460.

In some aspects, at a side opposite the connecting panel 442, the inner viewing panel 410 is adjacent a second connecting panel 470 along an eleventh fold line 472. The second connecting panel 470 may be used to couple the inner viewing panel 410 to the intermediate viewing panel 420. In some aspects, the second connecting panel 470 is frictionally engaged with a portion of an interior surface of the intermediate viewing panel 420 to secure the inner viewing panel 410 to a position perpendicular to the intermediate viewing panel 420. In other aspects, an adhesive or coupling mechanism is used to secure the second connecting panel 470 to the intermediate viewing panel 420.

Figure 20:
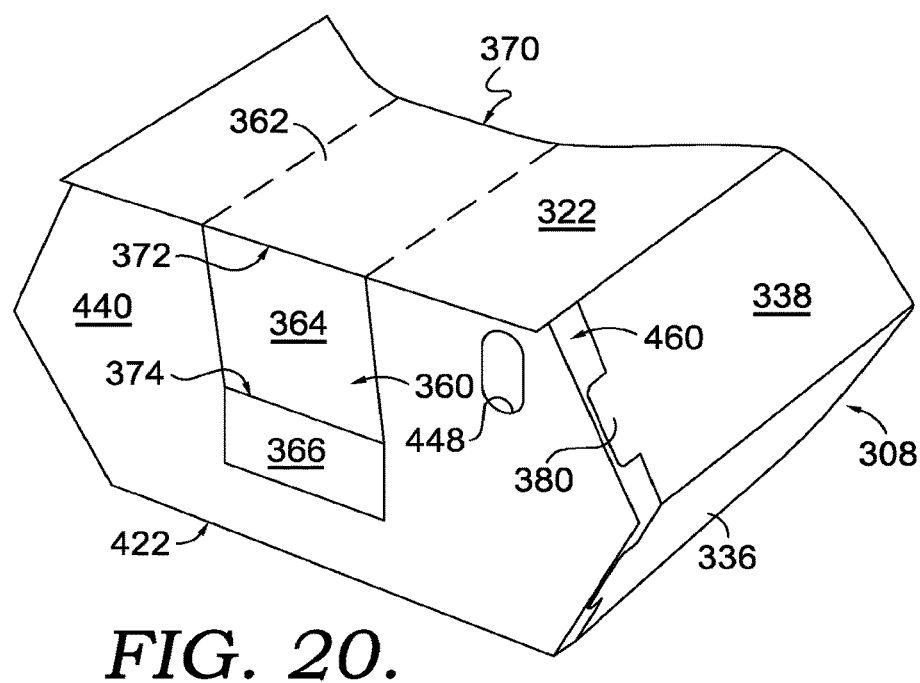
FIG. 20 depicts a rear perspective view of the viewer in an expanded configuration depicted in FIG. 19.
Figure 21:
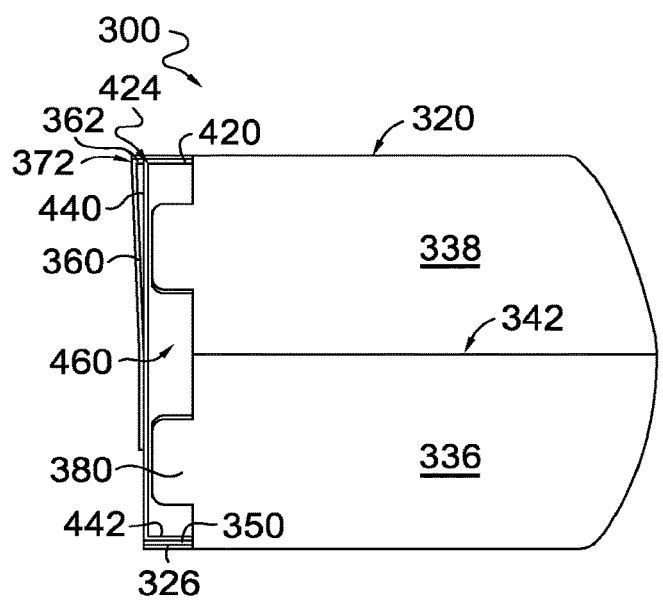
FIG. 21 depicts a side view of the viewer in an expanded configuration depicted in FIG. 19.
Figure 22:
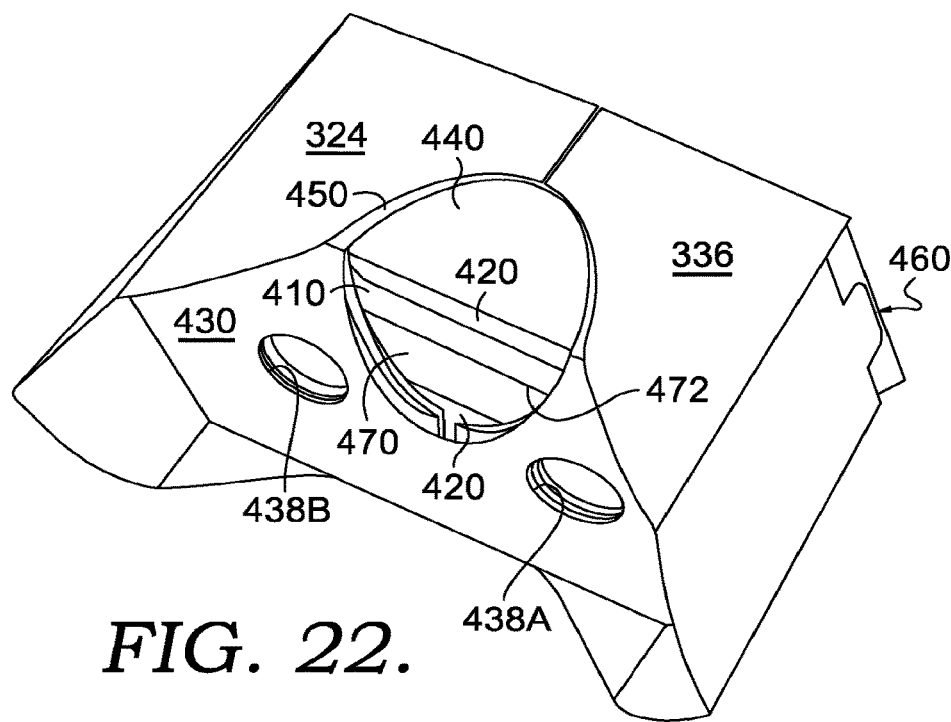
FIG. 22 depicts a bottom perspective view of the viewer in an expanded configuration depicted in FIG. 19.

A user may insert a virtual reality display device in the slot 460 by sliding the device between the back panel 440 and the inner viewing panel 410 in a similar manner shown with respect to viewer 100 in FIG. 4. Because the slot 460 of viewer 300 is formed by panels permanently coupled to one another along fold lines, the user does not need to do any additional assembly or disassembly to the viewer 300 to position the virtual reality display device into the slot 460 for use. In some aspects, the side panels 332 334, 336, and 338 of the body portion 304 may each include a tab 380 extending from side panels to at least partially cover the opening of the slot 460 as shown in FIGS. 19-21. Each tab 380 may abut the respective side panel along a fold line such that the tabs 380 may be folded by a user. The user may fold one or more of the tabs 380 away from the slot 460 to insert a virtual reality display device into the slot 460 and may then fold the tabs 380 back over the slot 460. In this way, the tabs 380 may be used to help secure the virtual reality display device within the slot 460 to reduce the risk of the device inadvertently sliding out of the slot 460 when in use.

Although FIG. 23 shows the intermediate viewing panel 420 being adjacent the back panel 440 via along a fold line, it is contemplated that that other configurations may be used to form the slot 460. For example, in other aspects of the viewer 300, the intermediate viewing panel 420 may be adjacent the inner view panel 410 via a fold line, and the first body wall 322 may form the top portion of the slot 460.

As previously described, when in the expanded configuration, the viewer 300 is designed to allow a user to see a virtual reality display on a virtual reality display device that has been inserted into the slot 460. As such, the inner viewing panel 410 and the outer viewing panel 430 may include one or more apertures through which a user can see the virtual reality display. For example, the inner viewing panel 410 may include a display aperture 416 that provides a view of the virtual reality display device in the slot 460. Although not fully visible in FIG. 23, the display aperture 416 of viewer 300 may comprise a similar shape and size as the display aperture 216 of viewer 100 illustrated in FIGS. 6-7. Similarly, just as with the display aperture 216 of viewer 100, some embodiments of viewer 300 may include a reinforcement panel that overlays and is secured to the inner viewing panel 410 to increase the strength of the inner viewing panel 410 around the display aperture 416. In some aspects, any such reinforcement panel is of a similar size and shape as the inner viewing panel 410 such that the reinforcement panel reinforces the entire perimeter of the display aperture 416. In other aspects, the inner viewing panel 410 may include one or more reinforcement panels that extend around only a portion of the inner viewing panel 410.

Additionally, the outer viewing panel 430, which is parallel to the inner viewing panel 410, may include one or more viewing apertures that provide a user with a view of the inside of the viewer 300 to see the virtual reality display. For instance, the outer viewing panel 430 may include two circular viewing apertures 438A-B positioned on the outer viewing panel 430 to align with a user's eyes when the first body panel 322 is positioned against a user's forehead. Accordingly, a user may position the viewer 300 against the user's head so that each eye can see through a viewing aperture 438A-B in the outer viewing panel 430 and through the display aperture 416 in the inner viewing panel 410 to see a virtual realty display on a virtual reality display device inserted into the slot 460. In some embodiments, the viewer 300 includes a lens in each of the viewing apertures 438A-B.

Figure 24:
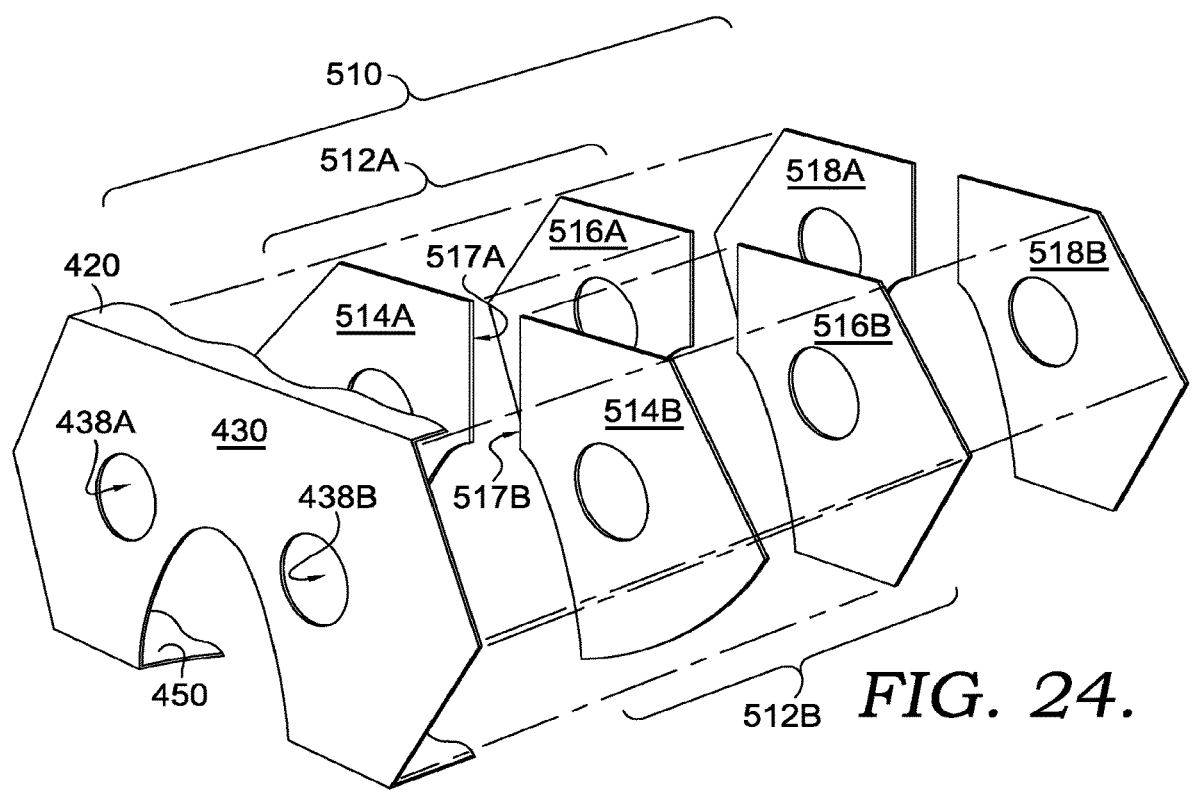
FIG. 24 depicts a front perspective view of the outer viewing panel of the viewer of FIG. 19 with reinforcement panels shown in an exploded view, in accordance with an aspect of the present invention.

In some embodiments, the viewing portion 302 includes a plurality of reinforcement panels secured to the outer viewing panel 430. FIG. 24 illustrates the outer viewing panel 430 and a plurality of reinforcement panels 510 in an exploded view. In exemplary aspects, each half of the outer viewing panel 430 has three corresponding reinforcement panels 510. For example, the half of the outer viewing panel 430 with the viewing aperture 430A that is configured to be used with a user's left eye may include reinforcement panels 514A, 516A, and 518A while the half of the outer viewing panel 430 with the viewing aperture 430B configured to be used with a user's right eye may include reinforcement panels 514B, 516B, and 518B. Reinforcement panels 514A, 516A, and 518A may of be the same or substantially the same shape and size of the half of the outer viewing panel 430 to which they correspond and may be mirror images of the reinforcement panels 514B, 516B, and 518B. Additionally, all the reinforcement panels 510 may have a viewing aperture positioned such that the viewing apertures of reinforcement panels 514A, 516A, and 518A are all aligned with the viewing aperture 438A and the viewing apertures of reinforcement panels 514B, 516B, and 518B are all aligned with the viewing aperture 438B.

In some aspects, one or more of the reinforcement panels 510 are directly connected to one another via a fold line such that some of the panels are part of a larger panel. For instance, reinforcement panels 514A and 516A may abut along first reinforcement fold line 517A to form panel 512A, and reinforcement panels 514B and 516B may abut second first reinforcement fold line 517B to form panel 512B. In other words, panels 512A and 512B may each have a similar shape and size to the entire outer viewing panel 430 but are folded in half such that each panel is used to reinforce only one half of the outer viewing panel 430. The die cut of the viewing portion shown in FIG. 29A further illustrates this configuration.

It is also contemplated that, in other aspects, each reinforcement panel 510 is formed as a separate panel such that they do not adjoin any other reinforcement panels 510 along a fold line. Alternatively, each of the reinforcement panels 510 may be secured to at least one other reinforcement panel 510 via a fold line. Further, it is also contemplated that each reinforcement panel 510 may be configured to correspond to the entire outer viewing panel 430, rather than only half, and the number of reinforcement panels 510 may be less than or greater than what is depicted in FIG. 24.

As the viewer 300 is designed to be used when placed up against a user's face, exemplary embodiments are adapted to fit around the user's face. For example, the front edges of the first body panel 322, the second body panel 324, and the third body panel 326 may be curved inward to accommodate the curvature of a user's face. Additionally, the outer viewing panel 430 may be shaped to include an arched edge between the viewing apertures 438A-B to accommodate a user's nose when viewing a virtual reality display through the viewing apertures 438A-B.

Returning to FIG. 20, the viewer 300 may comprise a coupling mechanism 360 to couple the viewing portion 302 to the body portion 304 such that the viewing portion 302 and the body portion 304 may be configured to move together between expanded and collapsed configurations. In exemplary embodiments, for example, the coupling mechanism 360 comprises a series of hinging panels separating by a plurality of fold lines such that the panels form a hinge that allows the viewer 300 to move between expanded and collapsed configurations. The coupling mechanism 360 may comprise a first hinging panel 362, a second hinging panel 364 abutting the first hinging panel 362 along a first hinging fold line 372, and a third hinging panel 366 abutting the second hinging panel 364 along a second hinging fold line 374. The first hinging panel 362 may be coupled to the first body panel 322 of the body portion 304 while the third hinging panel 366 may be coupled to the back panel 440 of the viewing portion 302. The second hinging panel 364 may be left not directly secured to other panels of the viewer 300.

In some aspects, the first hinging panel 362 is adjacent a portion of the first body panel 322 along a third hinging fold line 370. The third hinging fold line 370 may extend along a portion of the side of the first body panel 322 that is opposite the side of the first body panel 322 that is proximate to the back panel 440. Accordingly, the first hinging panel 362 may extend across the length of the first body panel 322. As shown in FIG. 20, the first hinging panel 362 may extend across an interior surface of the first body panel 322 such that the first hinging panel 362 is positioned between the first body panel 322 and the intermediate viewing panel 420 (not shown in FIG. 20). In other aspects, the first hinging panel 362 overlays a portion of the exterior surface of the first body panel 322 such that it is visible from an exterior view of the viewer 300. At least a portion of the surface of the first hinging panel 362 that contacts the surface of the first body panel 322 may be secured to the first body panel 322 via adhesive or a bonding agent to prevent the first hinging panel 362 from shifting. The third hinging panel 366 may be secured to a portion of the back panel 440 via adhesive or bonding agent. In exemplary aspects, the third hinging panel 366 is central to a central portion of the back panel 440.

The body portion 304 of the viewer 300 may be secured to the viewing portion 302 in other areas in addition to the coupling mechanism 360 between the first body panel 322 and the back panel 440. In one aspect, layers of adhesive in select areas may be used to directly couple the body portion 304 to the viewing portion 302. For instance, one or more layers of adhesive may be used between the bottom panel 450 of the viewing portion 302 and the second body panel 324 and the third body panel 326 of the body portion 304. Further, in some aspects, the connecting panel 442, which forms the bottom portion of the slot 460, may be secured to a portion of the bottom panel 450. These additional coupling mechanisms may be used to help maintain proper positioning of the various panels relative to one another as the viewer 300 is moved between the expanded and collapsed configurations. Through the hinging mechanism and, in some aspects, the use of adhesive in pre-defined locations, the viewer 300 may be expanded and collapsed solely through the application of a small amount of force without requiring additional assembly or disassembly from the user.

When the viewer 300 is in the expanded configuration, the second hinging panel 364 and the third hinging panel 366 may be substantially flush with the back panel 440 and substantially perpendicular to the first hinging panel 362, as shown in FIGS. 20 and 21. When the viewer 300 is moved into a collapsed configuration, the second hinging panel 364 is folded relative to the first and second hinging fold lines 372 and 374, as shown in FIG. 25.

Figure 25:
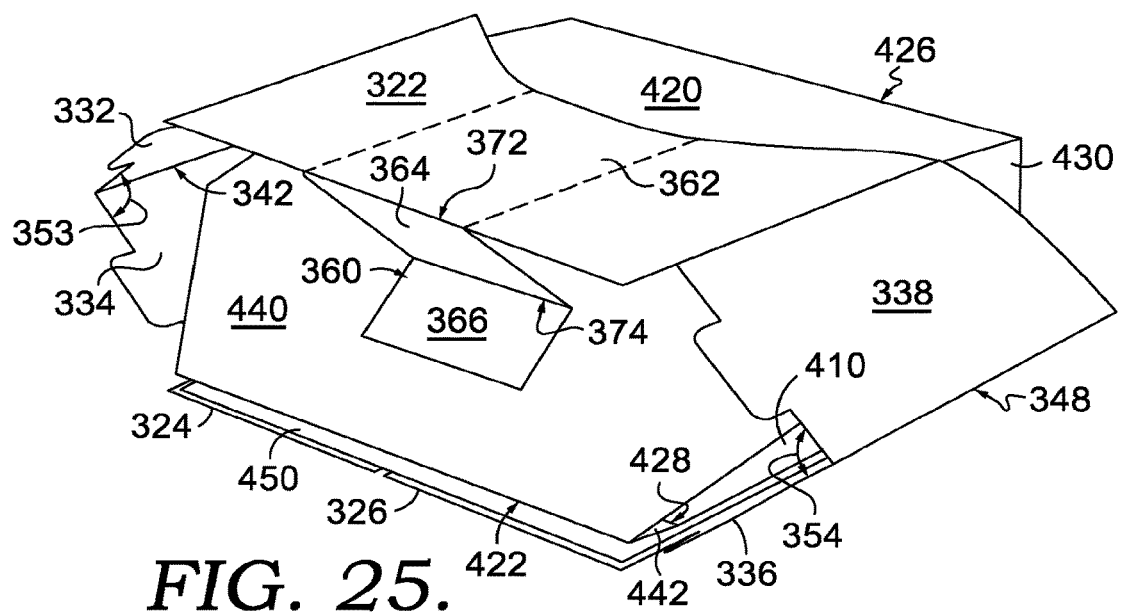
FIG. 25 depicts a rear perspective view of the viewer depicted in FIG. 19 in a partially collapsed configuration.

As seen in the partially collapsed view depicted in FIG. 25, the viewer 300 collapses in a similar manner as viewer 100. The first side panel 332 and the second side panel 334 may fold at the second fold line 342 to move toward each other. Likewise, the third side panel 336 and the fourth side panel 338 fold at the fifth fold line 348 so that the third side panel 336 moves closer to the fourth side panel 338. As the side panels 332, 334, 336, and 338 are folded inwards, the first angle 353 and the second angle 354 decrease. At the same time, the first body panel 322 is moved closer to the second body panel 324 and the third body panel 326.

The viewing portion 302 disposed within the cavity of the body portion 304 also collapses. Specifically, the intermediate viewing panel 420 slides forward to move out from underneath the first body panel 322, allowing the first body panel 322 to be moved closer to the second body panel 324 and the third body panel 326. The outer viewing panel 430 folds in toward the intermediate viewing panel 420 along the seventh fold line 426. The back panel 440 folds outward from the intermediate viewing panel 420 at the eighth fold line 424 while folding in at the ninth fold line 422 towards the connecting panel 442.

Unlike with the viewer 100, however, the entire back panel 440 folds further into the cavity formed by the body portion 304, rather than folding onto itself. As the back panel 440 folds, the back panel 440 moves closer to the bottom panel 450, which causes the inner viewing panel 410 to also move closer to the bottom panel 450. The hinging panels 362, 364, and 366 allow the entire back panel 440 to fold inward while remaining coupled to the body portion 304. When collapsing, the second hinging panel 364 folds inward at the first hinging fold line 372 such that it moves towards the first hinging panel 362. At the same time, the second hinging panel 364 also folds at the second hinging fold line 374 to move toward the third hinging panel 366. Once fully collapsed, the second hinging panel 364 is at least partially layered between the first hinging panel 362 and the third hinging panel 366.

Figure 26:
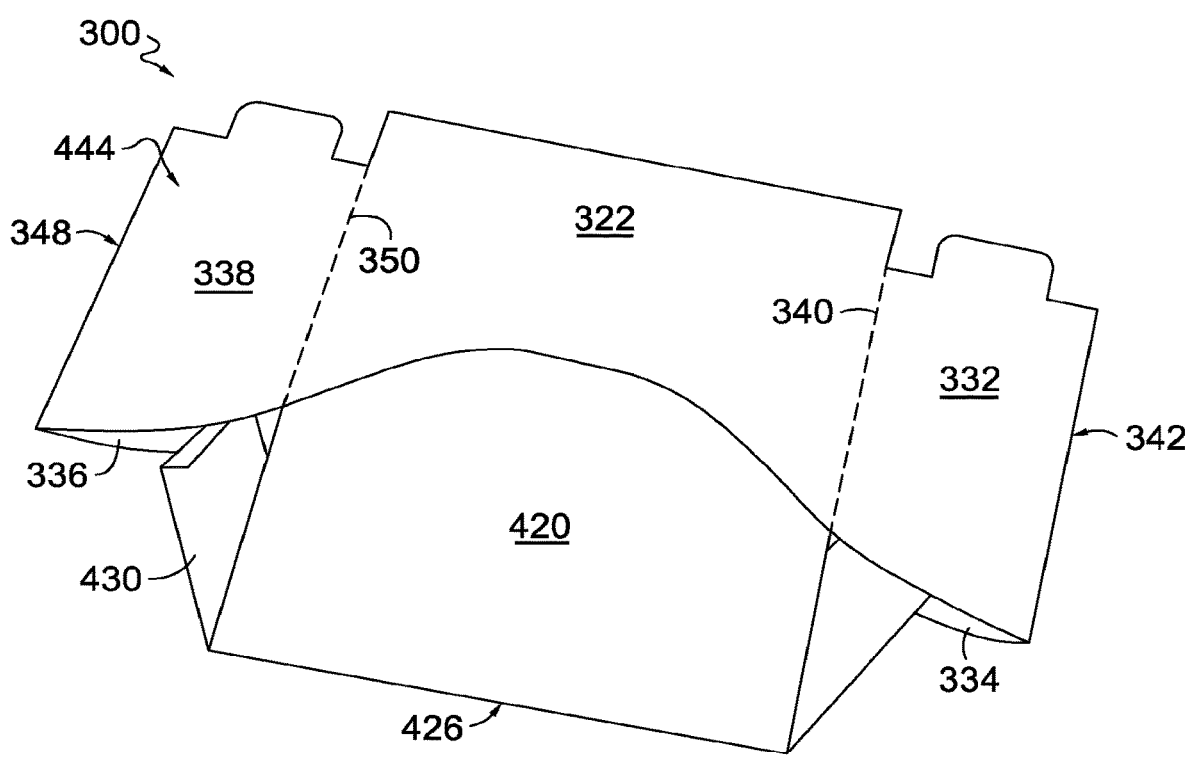
FIG. 26 depicts a top perspective view of the viewer depicted in FIG. 19 in a fully collapsed configuration.
Figure 27:
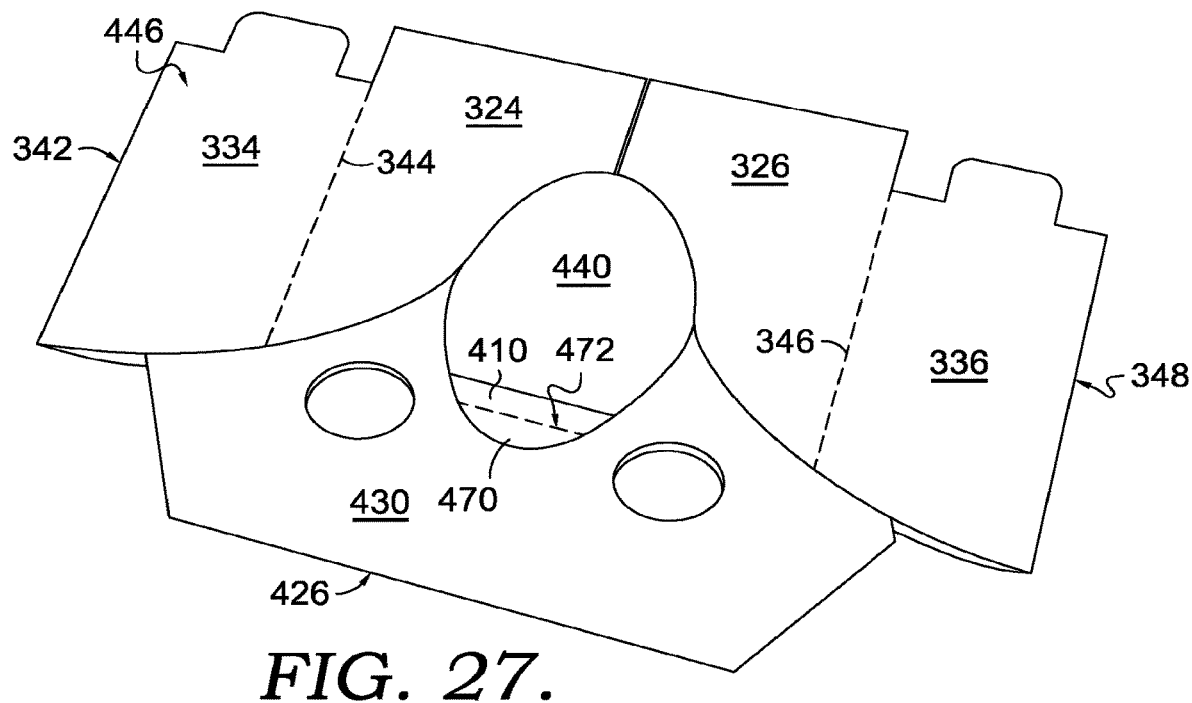
FIG. 27 depicts a bottom perspective view of the viewer in the collapsed configuration depicted in FIG. 26.

FIGS. 26-27 illustrate top perspective and bottom perspective views, respectively, of the viewer 300 when in a fully collapsed configuration. Similar to viewer 100, in this configuration, a top surface 444 of the viewer 300, shown in FIG. 26, comprises the first side panel 332, the first body panel 322, and the fourth side panel 338. The bottom surface 446 of the viewer 300 in a collapsed configuration, shown in FIG. 27, comprises the second side panel 334, the second body panel 324, the third body panel 326, and the third side panel 336. The intermediate viewing panel 420 and at least a portion of the outer viewing panel 430 may be visible and sticking out between the top surface 444 and the bottom surface 446. The inner viewing panel 410, the first connecting panel 442 (not visible), and the second connecting panel 470 may be layered between the outer viewing panel 430 on one side and the back panel 440 and intermediate viewing panel 420 on the other side. The viewer 300 may move from the collapsed configuration to an expanded configuration when a user pushes together the second fold line 342 and the fifth fold line 348.

When in the collapsed configuration, the viewer 300 may be relatively flat. For example, when in a fully collapsed configuration, the viewer 300 may have a thickness between the top surface 444 and the bottom surface 446 that is less than one-half of an inch in some embodiments. In some aspects, the thickness may be less than one-fourth of an inch. The ability of the viewer 300 to be placed in a collapsed position to have a thin profile may be desirable when using the viewer 300 for promotional purposes. For example, the viewer 300 with promotional material, such as advertisements, may be handed out by businesses or mailed to potential customers.

Figure 28:
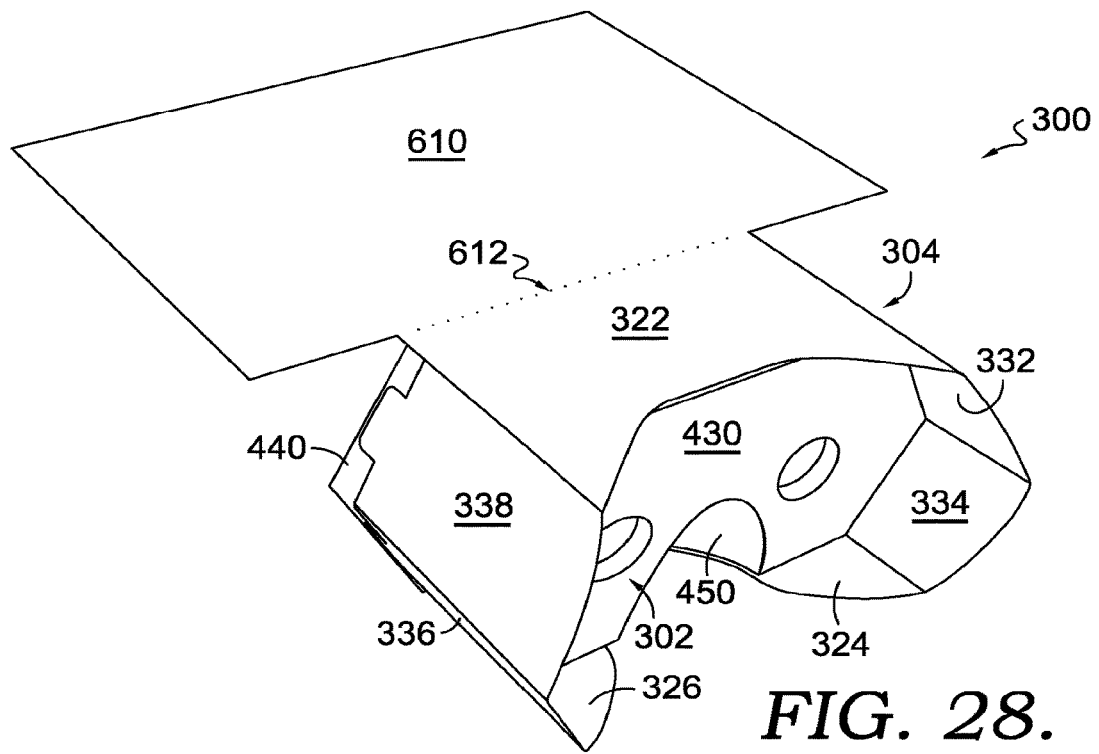
FIG. 28 depicts a front perspective view of a viewer having a detachable portion and in an expanded configuration, in accordance with an alternate embodiment of the present invention.

An embodiment of the viewer 300 with promotional materials is depicted in FIG. 28. In this embodiments, the viewer 300 may include a detachable portion comprising a detachable panel 610 coupled to the body portion 304 at a fold line. In some embodiments, such as the one illustrated in FIG. 28, this fold line is a plurality of perforations 612, and the detachable panel 610 is coupled to the first body panel 322 along the plurality of perforations 612. Similar to the detachable panel 252 of viewer 100 depicted in FIG. 16, the plurality of perforations 612 may be the only mechanism attaching the detachable panel 610 to the rest of the viewer 300. Accordingly, the detachable panel 610 may be completely detachable from the rest of the viewer 300 along the plurality of perforations 612. In exemplary aspects, the plurality of perforations 612 couples the detachable panel 610 along a side of the first body panel 322 that is opposite the side of the first body panel 322 that abuts the first hinging panel 362 via the third hinging fold line 370. The detachable panel 610 may be of a similar size and shape as detachable panel 252 of viewer 100, and the detachable panel 610 may include printed promotional material or may be secured to promotional material in the same manner as described with respect to detachable panel 252.

Each portion of the viewer 300 may comprise a unitary construction. In other words, the various panels comprising the viewing portion 302 may be manufactured from a single piece of paper or cardstock while the panels comprising the body portion 304 may be manufactured from a second, single piece of paper or cardstock. In that regard, FIGS. 29A-B and 30A-B illustrate die-cut blanks of cardstock or paperboard material that can be folded along the illustrated fold lines to make the body portion 304 and the viewing portion 302 of the viewer 300. By forming each portion of the viewer 300 from a single unitary piece of cardstock, the cardstock may be run through a printer prior to being cut out to print a design, coloring, a pattern, advertisement, or other indicia on one or both sides of the viewer 300.

With reference to FIGS. 29A-B, portions of the blanks 710A and 710B are identified by the reference characters discussed above with respect to the assembled viewer 300. Starting with FIG. 29A, blank 710A may be folded to form the viewing portion 302. The reinforcement panels 510 may be folded along a plurality of fold lines to overlay the outer viewing panel 430. Specifically, reinforcement panel 514A may fold inward along first reinforcement fold line 517A toward reinforcement panel 516A. Reinforcement panels 514A and 516A (collectively referred to as panel 512A) may then fold inward at third reinforcement fold line 504 toward the outer viewing panel 430. Reinforcement panel 518A may also fold inward at a fourth reinforcement fold line 502 toward the outer viewing panel 430. Reinforcement panels 514B, 516B, and 518B may fold along fold lines 517B, 508, and 506 in a similar fashion.

The bottom panel 450 is folded inward at the twelfth fold line 436 toward the outer viewing panel 430. The outer viewing panel 430 is folded inward at the seventh fold line 426 towards the interior surface of the intermediate viewing panel 420 while the intermediate viewing panel 420 is folded inward at the eighth fold line 424 towards the interior surface of the back panel 440. The connecting panel 442 is folded inward at the ninth fold line 422 toward the back panel 440, and the inner viewing panel 410 is folded inward at the tenth fold line 428 toward the connecting panel 442 until the inner viewing panel 410 is parallel to the back panel 440. As the inner viewing panel 410 is folded upward, the second connecting panel 470 folds at the eleventh fold line 472 such that a portion of the intermediate viewing panel 420 overlays the second connecting panel 470.

Blank 710B provides various panels that may be folded to form the body portion 304 in which the viewing portion 302 is later enclosed. The first body panel 322 may fold inward at the first fold line 340 towards the interior surface of the first side panel 332, which may fold inward at the second fold line 342 towards the interior surface of the second side panel 334. The second side panel 334 may fold inward at the third fold line 344 towards the interior surface of the second body panel 324. The other side may of the first body panel 322 may be folded in a similar way such that the first body panel 322 may fold inward at the sixth fold line 350 toward the fourth side panel 338, and the fourth side panel 338 may fold inward at the fifth fold line 348 toward the third side panel 336. The third side panel 336 may fold inward toward the third body panel 326 at the fourth fold line 346. The first hinging panel 362 may fold inward at the third hinging fold line 370 toward the interior surface of the first body panel 322 until a portion of the first body panel 322 overlays the first hinging panel 362, and the second hinging panel 364 folds in at the first hinging fold line 372 toward the first hinging panel 362. To couple the viewing portion 302 formed by blank 710A to the body portion 304 formed by blank 710B, the third hinging panel 366 may be secured to the exterior surface of the back panel 440 via adhesive.

FIGS. 30A-B depict the blanks used to form the viewer 300 with a detachable portion as depicted in FIG. 28. The viewing portion 302 is formed with blank 710A as described above with reference to FIG. 29A. FIG. 30B depicts the blank 710B of FIG. 29B with the addition of the detachable portion. As such, the various panels discussed with respect to the blanks 710A and 710B in FIGS. 29A-29B apply to FIGS. 30A-30B. FIG. 30A further shows the blank 710B having a detachable panel 610 that is removeably coupled to the first body panel 322 along a plurality of perforations 612. Because the detachable panel 610 is part of a single die-cut blank 710B with the other panels of the body portion 304, promotional material may be printed on one or both sides of the detachable panel 252 at the same time a background, pattern, or other indicia is printed on the other panels of the body portion 304. Additionally, eliminating the need to assemble promotional material separately may decrease the cost of manufacturing the viewer for promotional purposes.

While the invention has been described generally as a collapsible virtual reality (VR) viewer assembly, the concepts can be readily applied to create a collapsible augmented reality (AR) viewer assembly. When used a VR viewer, the user only needs to see the display screen of the smartphone when it is placed in the VR viewer. The remainder of the smartphone may be generally hidden from view and the viewer simply needs to only hold the phone in the slot 460. In the VR context, everything that is displayed on the display screen is created or virtual.

In an AR context, however, images of real items are displayed on a display screen and the real items are augmented with the placement of some created or virtual items on the display. The display of the real items is augmented with the addition of virtual items being displayed. AR is generally done by having a camera film a real environment and display the image on a display in real time (i.e., "live"). This can be accomplished with a smartphone, as it has not only a display screen, but also a camera. The primary camera on most smartphones is on a side opposite the display screen. Therefore, when the smartphone is received in the slot 460, the back panel 440 generally covers the rear of the smartphone (i.e., the side opposite the display screen, since the display screen is facing the user). An aperture 448 may be provided in the back panel 440 in certain embodiments to provide an opening through the back panel 440 such that a camera of the smartphone may be used while the smartphone is received in the slot 460. The aperture 448 aligns with the camera of the smartphone when the smartphone is fully received in the slot 460. The viewer can then hold the smartphone while the smartphone "films" the environment in front of the viewer and displays it on the display screen to be augmented in an AR setting.

Embodiments of the present invention have been described with the intent to be illustrative rather than restrictive. Alternative embodiments will become apparent to those skilled in the art that do not depart from the scope of the invention. A skilled artisan may develop alternative means of implementing the aforementioned improvements without departing from the scope of the present invention. It will be understood that certain features and subcombinations are of utility and may be employed without reference to other features and subcombinations and are contemplated as within the scope of the claims.

What is claimed is:

1. A collapsible virtual reality viewer comprising:
    a body portion, the body portion comprising:
        a first body wall;
        a second body wall opposite the first body wall;
        a first side wall joining the first body wall and the second body wall, the first side wall comprising a first side panel and a second side panel separated by a first fold line extending parallel to the first body wall; and
        a second side wall opposite the first side wall and joining the first body wall and the second body wall, the second side wall comprising a third side panel and a fourth side panel separated by a second fold line extending parallel to the first body wall; and
    a viewing portion coupled to the body portion, the viewing portion comprising:
        an outer viewing panel having one or more viewing apertures for permitting viewing a virtual reality display device when received in the viewer,
        an inner viewing panel having a display aperture for permitting viewing a virtual reality display device when received in the viewer,
        an intermediate viewing panel that spaces apart the outer viewing panel and a slot formed by the inner viewing panel and a back panel,
    wherein the collapsible virtual reality viewer includes a plurality of fold lines and is configured to fold between a collapsed configuration and an expanded configuration,
    wherein, when in the expanded configuration, the slot is configured to hold a virtual reality display device.

2. The collapsible virtual reality viewer of claim 1, wherein the back panel is part of the viewing portion and abuts one or more panels of the viewing portion along fold lines.

3. The collapsible virtual reality view of claim 2, wherein the back panel abuts the intermediate viewing panel along a third fold line.

4. The collapsible virtual reality viewer of claim 2, wherein the back panel is separated from the inner viewing panel by a connecting panel, wherein the connecting panel is perpendicular to the back panel and the inner viewing panel when the collapsible virtual reality viewer is in the expanded configuration.

5. The collapsible virtual reality viewer of claim 2, wherein the back panel of the viewing portion is permanently secured to the body portion via one or more hinging panels.

6. The collapsible virtual reality viewer of claim 5, wherein the first body wall comprises a first body panel, and wherein the one or more hinging panels abut the first body panel along a third fold line.

7. The collapsible virtual reality viewer of claim 6, wherein the one or more hinging panels comprise one or more additional fold lines configured to fold as the back panel moves from a position perpendicular to the first body panel when in the expanded configuration to a position parallel to the first body panel when in the collapsed configuration.

8. The collapsible virtual reality viewer of claim 2, wherein when the collapsible virtual reality viewer is in the collapsed configuration, at least part of the back panel and at least part of the front viewing panel is positioned between the first side panel and the second side panel.

9. The collapsible virtual reality viewer of claim 2, wherein when the collapsible virtual reality viewer is in the collapsed configuration, at least part of the back panel and at least part of the front viewing panel is positioned between the third side panel and the fourth side panel.

10. The collapsible virtual reality viewer of claim 1, wherein a first angle between the first side panel and the second side panel and a second angle between the third side panel and the fourth side panel are each less than 180 degrees when the collapsible virtual reality viewer is in the expanded configuration.

11. The collapsible virtual reality viewer of claim 1, wherein the viewing portion further comprises a plurality of reinforcement panels secured to the outer viewing panel, each reinforcement panel having one or more viewing apertures positioned to align with the one or more viewing apertures of the outer viewing panel.

12. A collapsible virtual reality viewer, the collapsible virtual reality viewer comprising:
    a body portion, the body portion comprising:
        a first body wall;
        a second body wall opposite the first body wall;
        a first side wall joining the first body wall and the second body wall, the first side wall comprising a first side panel and a second side panel separated by a first fold line extending parallel to the first body wall; and
        a second side wall opposite the first side wall and joining the first body wall and the second body wall, the second side wall comprising a third side panel and a fourth side panel separated by a second fold line extending parallel to the first body wall; and
    a viewing portion coupled to the body portion, the viewing portion comprising:
        an outer viewing panel having one or more viewing apertures for permitting viewing a virtual reality display device when positioned in the viewer,
        an inner viewing panel having a display aperture for permitting viewing a virtual reality display device when positioned in the viewer,
        a back panel, the back panel and the inner viewing panel forming a slot,
        an intermediate viewing panel that spaces apart the outer viewing panel and the slot; and
    a detachable portion comprising a detachable panel removeably coupled to the first body wall along a plurality of perforations,
    wherein the collapsible virtual reality viewer includes a plurality of fold lines and is configured to fold between a collapsed configuration and an expanded configuration,
    wherein, when in the expanded configuration, the slot is configured to hold a virtual reality display device in the viewer.

13. The collapsible virtual reality viewer of claim 12, wherein the detachable portion includes promotional material attached to or printed on the detachable panel.

14. The collapsible virtual reality viewer of claim 12, wherein the body portion is coupled to the viewing portion via one or more hinging panels, at least one hinging panel being adjacent the first body wall at a third fold line on a side of the first body wall that is opposite the plurality of perforations.

15. The collapsible virtual reality view of claim 12, wherein the back panel abuts the intermediate viewing panel along a third fold line.

16. The collapsible virtual reality viewer of claim 12, wherein when the collapsible virtual reality viewer is in the collapsed configuration, at least part of the back panel and at least part of the front viewing panel is positioned between the first side panel and the second side panel.

17. A collapsible virtual reality viewer assembly comprising:
   a body portion formed from a first piece of material, the body portion comprising:
      a first body panel;
      a second body panel;
      a third body panel;
      a first side panel abutting the first body panel along a first fold line;
      a second side panel abutting the second body panel along a second fold line, wherein the first side panel and the second side panel are separated by a third fold line extending parallel to the first fold line and the second fold line;
      a third side panel abutting the third body panel along a fourth fold line; and
      a fourth side panel abutting the first body panel along a fifth fold line, wherein the third side panel and the fourth side panel are separated by a sixth fold line extending parallel to the fourth fold line and the fifth fold line; and
   a viewing portion formed from a second piece of material, the viewing portion comprising:
      an outer viewing panel having one or more viewing apertures for permitting the viewing of a virtual reality display device when positioned in the viewer,
      an intermediate viewing panel adjacent the outer viewing panel, wherein the intermediate viewing panel and the outer viewing panel abut along a seventh fold line,
      an inner viewing panel having a display aperture for permitting the viewing of a virtual reality display device when positioned in the viewer,
      a back panel, wherein the intermediate viewing panel abuts one of the inner viewing panel and the back panel along an eighth fold line, and
   wherein the viewing portion and the body portion are configured to fold along the fold lines and be secured together to form the collapsible virtual reality viewer assembly, and
   wherein panels of the body portion are die cut from the first piece of material and the panels of the viewing portion are die cut from the second piece of material.

18. The collapsible virtual reality viewer assembly of claim 17, wherein the first piece of material and the second piece of material each comprise cardstock, and wherein the back panel includes an aperture therein to allow for the virtual reality viewer to be used as an augmented reality viewer.

19. The collapsible virtual reality viewer assembly of claim 17, wherein the first body panel abuts one or more hinging panels along a ninth fold line.

20. The collapsible virtual reality viewer assembly of claim 17, wherein the back panel abuts the intermediate viewing panel along the eighth fold line.

* * * * *

UNITED STATES PATENT AND TRADEMARK OFFICE
CERTIFICATE OF CORRECTION

PATENT NO.         : 10,974,863 B2
APPLICATION NO.    : 16/419440
DATED              : April 13, 2021
INVENTOR(S)        : Robert R. Pavlu, Jr., Thomas A. Wallen and Scott A. Schimke Page 1 of 1

It is certified that error appears in the above-identified patent and that said Letters Patent is hereby corrected as shown below:

In the Specification
Column 15, Line 25: "contemplated that that other configurations" should read --contemplated that other configurations--.

In the Claims
Claim 3, Column 21, Line 51: "virtual reality view" should read --virtual reality viewer--.
Claim 15, Column 23, Line 10: "virtual reality view" should read --virtual reality viewer--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*